United States Patent
Ren et al.

(10) Patent No.: US 12,231,439 B2
(45) Date of Patent: Feb. 18, 2025

(54) INFORMATION VERIFICATION METHOD, APPARATUS, AND DEVICE

(71) Applicant: HUAWEI TECHNOLOGIES CO., LTD., Guangdong (CN)

(72) Inventors: Shoushou Ren, Beijing (CN); Bingyang Liu, Beijing (CN); Fei Yang, Beijing (CN); Xinpeng Wei, Beijing (CN); Xue Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 554 days.

(21) Appl. No.: 17/479,931

(22) Filed: Sep. 20, 2021

(65) Prior Publication Data
US 2022/0006817 A1 Jan. 6, 2022

Related U.S. Application Data

(63) Continuation of application No. PCT/CN2020/080894, filed on Mar. 24, 2020.

(30) Foreign Application Priority Data

Mar. 29, 2019 (CN) .......................... 201910251489.2

(51) Int. Cl.
*H04L 61/4511* (2022.01)
*H04L 9/00* (2022.01)
*H04L 9/40* (2022.01)

(52) U.S. Cl.
CPC .............. *H04L 63/126* (2013.01); *H04L 9/50* (2022.05); *H04L 61/4511* (2022.05)

(58) Field of Classification Search
CPC ....... H04L 63/126; H04L 61/4511; H04L 9/50
See application file for complete search history.

(56) References Cited

U.S. PATENT DOCUMENTS

| 2003/0009694 | A1* | 1/2003 | Wenocur | H04L 63/0823 713/176 |
| 2003/0026273 | A1* | 2/2003 | Davison | H04L 12/2856 370/409 |

(Continued)

FOREIGN PATENT DOCUMENTS

| CN | 107453900 A | 12/2017 |
| CN | 108805573 A | 11/2018 |

(Continued)

OTHER PUBLICATIONS

Benshoof et al., "Distributed Decentralized Domain Name Service," 2016 IEEE International Parallel and Distributed Processing Symposium Workshops, May 2016, 9 pages.

(Continued)

*Primary Examiner* — Robert B Leung
*Assistant Examiner* — Howard H. Louie
(74) *Attorney, Agent, or Firm* — Fish & Richardson P.C.

(57) ABSTRACT

Embodiments of this application provide an information verification method, apparatus, and device. The method includes: sending a first message to a server that includes a target domain name and first indication information, which indicates a status of first verification information stored in a client, the first verification information is verification information generated based on multiple domain names and owner information of the multiple domain names, the first verification information verifies the owner information of the multiple domain names, and the multiple domain names include a target domain name; receiving a second message sent by the server based on the first message, where the second message indicates target first verification information, which is used by the client to verify owner information of the target domain name; and verifying the obtained owner (Continued)

information of the target domain name based on the second message.

12 Claims, 12 Drawing Sheets

(56) References Cited

U.S. PATENT DOCUMENTS

| | | | |
|---|---|---|---|
| 2003/0182414 A1* | 9/2003 | O'Neill | G06F 9/30021 |
| | | | 717/170 |
| 2008/0034211 A1* | 2/2008 | Shull | H04L 61/4511 |
| | | | 713/175 |
| 2011/0078230 A1 | 3/2011 | Sepulveda | |
| 2013/0332575 A1* | 12/2013 | Song | H04L 67/1097 |
| | | | 709/219 |
| 2017/0236123 A1 | 8/2017 | Ali et al. | |
| 2020/0145234 A1* | 5/2020 | Nishijima | H04L 9/3236 |

FOREIGN PATENT DOCUMENTS

| | | |
|---|---|---|
| CN | 109450843 A | 3/2019 |
| WO | 2008116416 A1 | 10/2008 |

OTHER PUBLICATIONS

Extended European Search Report issued in European Application No. 20785173.4 on Feb. 4, 2022, 11 pages.
PCT International Search Report and Written Opinion in International Application No. PCT/CN2020/080894, dated May 28, 2020, 17 pages.
Office Action issued in Chinese Application No. 201910251489.2 on Aug. 29, 2022, 5 pages.

* cited by examiner

INFORMATION VERIFICATION METHOD, APPARATUS, AND DEVICE

CROSS-REFERENCE TO RELATED APPLICATIONS

This application is a continuation of International Application No. PCT/CN2020/080894, filed on Mar. 24, 2020, which claims priority to Chinese Patent Application No. 201910251489.2, filed on Mar. 29, 2019. The disclosures of the aforementioned applications are hereby incorporated by reference in their entireties.

TECHNICAL FIELD

This application relates to the field of Internet technologies, and in particular, to an information verification method, apparatus, and device.

BACKGROUND

A domain name system (DNS) is one of important Internet infrastructures. Specifically, a client may obtain, by interacting with a server, an Internet Protocol (IP) address of a target domain name that the client needs to access.

In a conventional technology, the client may send a DNS request message to the server, where the DNS request message is used to request the IP address of the target domain name. After receiving the DNS request message, the server may obtain the IP address of the target domain name from another server, and return the obtained IP address of the target domain name to the client. After receiving the IP address, the client may use the IP address as the IP address of the target domain name, to access the target domain name.

However, in the conventional technology, a problem exists that the client cannot verify the server because the client needs to trust the server unconditionally.

SUMMARY

This application provides an information verification method, apparatus, and device, to resolve a problem that a client cannot verify a server because the client needs to unconditionally trust the server in a conventional technology.

According to a first aspect, an embodiment of this application provides an information verification method, including:

receiving a first message sent by a client, where the first message includes a target domain name and first indication information, the first indication information is used to indicate a status of first verification information stored in a client, the first verification information is verification information generated based on a plurality of domain names and owner information of the plurality of domain names, the first verification information is used to verify the owner information of the plurality of domain names, and the plurality of domain names include the target domain name; and sending a second message to the client based on the first message, where the second message is used to indicate target first verification information, and the target first verification information is used by the client to verify owner information of the target domain name.

In the foregoing solution, the server receives the first message that includes the target domain name and the first indication information and that is sent by the client, and sends, to the client based on the first message, the second message that is used to indicate the target first verification information, so that the client can obtain the target first verification information that is used to verify the owner information of the target domain name. In this way, the client verifies the server.

In a possible implementation, the first verification information is verified by the client based on second verification information.

In the foregoing solution, the first verification information is verified by the client based on the second verification information. This can improve verification tightness.

In a possible implementation, the first indication information is specifically used to indicate that the first verification information is stored in the client, and that a version of the stored first verification information is a first version.

The sending a second message to the client based on the first message includes:

determining, based on the first message, whether first owner information of the target domain name is the same as second owner information of the target domain name, where the first owner information is owner information of the target domain name that is used to generate a second version of the first verification information, the second owner information is owner information of the target domain name that is used to generate the first version of the first verification information, and the second version is a latest version of the first verification information; and sending the second message to the client if the first owner information of the target domain name is different from the second owner information of the target domain name, where the second message includes the second version of the first verification information and target second verification information, the target second verification information is the second verification information used by the client to verify the second version of the first verification information, and the second version of the first verification information is the target first verification information; or sending the second message to the client if the first owner information of the target domain name is the same as the second owner information of the target domain name, where the target first verification information is the first verification information stored in the client.

In the foregoing solution, when owner information of the target domain name that is used to generate latest first verification information (namely, the second version of the first verification information) is the same as owner information of the target domain name that is used to generate the first verification information (namely, the first version of the first verification information) stored in the client, the client may verify the owner information of the target domain name by using the first verification information stored in the client. This avoids the following problem: A speed of accessing the target domain name by the client is relatively slow because the client needs to re-obtain latest first verification information from the server if there is a change in owner information that is of a non-target domain name and that is used to generate the first verification information.

In a possible implementation, the target first verification information is the first verification information stored in the client, and the second message is further used to indicate a version number of the second version.

The method further includes:

receiving a third message that is sent by the client based on the version number of the second version, where the third message is used to indicate to request the latest version of the first verification information; and sending a fourth message to the client based on the third message, where the fourth message includes the latest version of the first verification information.

In the foregoing solution, the server receives the third message that is sent by the client based on the version number of the second version and that is used to indicate to request the latest version of the first verification information, and sends, to the client based on the third message, a fourth message that includes the latest version of the first verification information, so that the client can obtain the latest version of the first verification information.

In a possible implementation, the first indication information is specifically used to indicate that the first verification information is not stored in the client.

The second message includes the second version of the first verification information and the target second verification information. The target second verification information is the second verification information used by the client to verify the second version of the first verification information. The second version is the latest version of the first verification information. The second version of the first verification information is the target first verification information.

In a possible implementation, the first message further includes second indication information, where the second indication information is used to indicate the client to request partial information in the second verification information.

The target second verification information in the second message is specifically the partial information in the target second verification information.

In the foregoing solution, the first message further includes the second indication information that is used to indicate the client to request the partial information in the second verification information. This can reduce an amount of information exchanged between the server and the client.

In a possible implementation, the second version is a latest generated version of the first verification information, or the second version is a version of the first verification information stored in a latest local snapshot.

In the foregoing solution, the second version is the latest generated version of the first verification information, so that the client can obtain the latest generated first verification information. The second version is the version of the first verification information stored in the latest local snapshot, so that the server can store a snapshot of the first verification information. This can avoid a large amount of resource consumption caused if the server stores all the first verification information.

In a possible implementation, the first verification information is verification information generated by a blockchain node based on the plurality of domain names and the owner information of the plurality of domain names, and the owner information of the target domain names is stored and maintained by a target smart contract account of a blockchain.

In the foregoing solution, the first verification information is generated by the blockchain node, so that the blockchain node can maintain the verification information, thereby improving flexibility of maintaining the verification information.

In a possible implementation, the first verification information is verification information generated by a blockchain node based on the plurality of domain names and the owner information of the plurality of domain names. The owner information of the target domain names is stored and maintained by a target smart contract account of a blockchain, and the second verification information is information in the blockchain.

In the foregoing solution, the second verification information is the information in the blockchain, so that a blockchain-based SPV technology can ensure correctness of the second verification information. It may be understood that the second verification information may alternatively not be the information in the blockchain if the blockchain-based technology is not considered to be used to ensure correctness of the second verification information.

According to a second aspect, an embodiment of this application provides an information verification method, including:

sending a first message to a server, where the first message includes a target domain name and first indication information, the first indication information is used to indicate a status of first verification information stored in a client, the first verification information is verification information generated based on a plurality of domain names and owner information of the plurality of domain names, the first verification information is used to verify the owner information of the plurality of domain names, and the plurality of domain names include the target domain name;

receiving a second message sent by the server based on the first message, where the second message is used to indicate target first verification information, and the target first verification information is used by the client to verify owner information of the target domain name; and verifying the obtained owner information of the target domain name based on the second message.

In a possible implementation, the first verification information is verified by the client based on second verification information.

In a possible implementation, the first indication information is specifically used to indicate that the first verification information is stored in the client, and that a version of the stored first verification information is a first version.

The second message includes a second version of the first verification information and target second verification information, where the target second verification information is the second verification information used by the client to verify the second version of the first verification information, and the second version of the first verification information is the target first verification information.

The verifying the owner information of the target domain name based on the second message includes:

verifying the second version of the first verification information based on the target second verification information; and after verification of the second version of the first verification information succeeds, verifying the owner information of the target domain name based on the second version of the first verification information.

In a possible implementation, the first indication information is specifically used to indicate that the first verification information is stored in the client, and that a version of the stored first verification information is a first version.

First target verification information is the first verification information stored in the client.

The verifying the owner information of the target domain name based on the second message includes:

verifying the owner information of the target domain name based on the first version of the first verification information.

In a possible implementation, the second message is further used to indicate a version number of the second version.

The method further includes: sending a third message to the server based on the version number of the second version, where the third message is used to indicate to request a latest version of the first verification information; and receiving a fourth message sent by the server based on the third message, where the fourth message includes the latest version of the first verification information; and storing the latest version of the first verification information.

In a possible implementation, the first indication information is specifically used to indicate that the first verification information is not stored in the client.

The second message includes a second version of the first verification information and target second verification information, where the target second verification information is the second verification information used by the client to verify the second version of the first verification information. The second version is a latest version of the first verification information, and the second version of the first verification information is the target first verification information.

The verifying the owner information of the target domain name based on the second message includes:

verifying the second version of the first verification information based on the target second verification information; and after verification of the second version of the first verification information succeeds, verifying the owner information of the target domain name based on the second version of the first verification information.

In a possible implementation, before the sending a first message to a server, the method further includes:

determining, based on stored verification information, to request partial information in the first verification information from the server.

The first message further includes second indication information, where the second indication information is used to indicate the client to request partial information in the second verification information.

The target second verification information in the second message is specifically the partial information in the target second verification information.

In a possible implementation, the second version is a latest generated version of the first verification information, or the second version is a version of the first verification information stored in a latest local snapshot.

In a possible implementation, the first verification information is verification information generated by a blockchain node based on the plurality of domain names and the owner information of the plurality of domain names, and the owner information of the target domain names is stored and maintained by a target smart contract account of a blockchain.

In a possible implementation, the first verification information is verification information generated by a blockchain node based on the plurality of domain names and the owner information of the plurality of domain names. The owner information of the target domain names is stored and maintained by a target smart contract account of a blockchain, and the second verification information is information in the blockchain.

According to a third aspect, an embodiment of this application provides an information verification apparatus, including:

a receiving unit, configured to receive a first message sent by a client, where the first message includes a target domain name and first indication information, the first indication information is used to indicate a status of first verification information stored in a client, the first verification information is verification information generated based on a plurality of domain names and owner information of the plurality of domain names, the first verification information is used to verify the owner information of the plurality of domain names, and the plurality of domain names include the target domain name; and a sending unit, configured to send a second message to the client based on the first message, where the second message is used to indicate target first verification information, and the target first verification information is used by the client to verify owner information of the target domain name.

In a possible implementation, the first verification information is verified by the client based on second verification information.

In a possible implementation, the first indication information is specifically used to indicate that the first verification information is stored in the client, and that a version of the stored first verification information is a first version.

The sending unit is specifically configured to:

determine, based on the first message, whether first owner information of the target domain name is the same as second owner information of the target domain name, where the first owner information is owner information of the target domain name that is used to generate a second version of the first verification information, the second owner information is owner information of the target domain name that is used to generate the first version of the first verification information, and the second version is a latest version of the first verification information; and send the second message to the client if the first owner information of the target domain name is different from the second owner information of the target domain name, where the second message includes the second version of the first verification information and target second verification information, the target second verification information is the second verification information used by the client to verify the second version of the first verification information, and the second version of the first verification information is the target first verification information; or send the second message to the client if the first owner information of the target domain name is the same as the second owner information of the target domain name, where the target first verification information is the first verification information stored in the client.

In a possible implementation, the target first verification information is the first verification information stored in the client, and the second message is further used to indicate a version number of the second version.

The receiving unit is further configured to receive a third message that is sent by the client based on the version number of the second version, where the third message is used to indicate to request the latest version of the first verification information.

The sending unit is further configured to send a fourth message to the client based on the third message, where the fourth message includes the latest version of the first verification information.

In a possible implementation, the first indication information is specifically used to indicate that the first verification information is not stored in the client.

The second message includes the second version of the first verification information and the target second verification information, where the target second verification information is the second verification information used by the client to verify the second version of the first verification information, the second version is a latest version of the first verification information, and the second version of the first verification information is the target first verification information.

In a possible implementation, the first message further includes second indication information, where the second indication information is used to indicate the client to request partial information in the second verification information.

The target second verification information in the second message is specifically the partial information in the target second verification information.

In a possible implementation, the second version is a latest generated version of the first verification information, or the second version is a version of the first verification information stored in a latest local snapshot.

In a possible implementation, the first verification information is verification information generated by a blockchain node based on the plurality of domain names and the owner information of the plurality of domain names, and the owner information of the target domain names is stored and maintained by a target smart contract account of a blockchain.

In a possible implementation, the first verification information is verification information generated by a blockchain node based on the plurality of domain names and the owner information of the plurality of domain names. The owner information of the target domain names is stored and maintained by a target smart contract account of a blockchain, and the second verification information is information in the blockchain.

According to a fourth aspect, an embodiment of this application provides an information verification apparatus, including:

a sending unit, configured to send a first message to a server, where the first message includes a target domain name and first indication information, the first indication information is used to indicate a status of first verification information stored in a client, the first verification information is verification information generated based on a plurality of domain names and owner information of the plurality of domain names, the first verification information is used to verify the owner information of the plurality of domain names, and the plurality of domain names include the target domain name;

a receiving unit, configured to receive a second message sent by the server based on the first message, where the second message is used to indicate target first verification information, and the target first verification information is used by the client to verify owner information of the target domain name; and a verification unit, configured to verify the obtained owner information of the target domain name based on the second message.

In a possible implementation, the first verification information is verified by the client based on second verification information.

In a possible implementation, the first indication information is specifically used to indicate that the first verification information is stored in the client, and that a version of the stored first verification information is a first version.

The second message includes a second version of the first verification information and target second verification information, where the target second verification information is the second verification information used by the client to verify the second version of the first verification information, and the second version of the first verification information is the target first verification information.

The verification unit is specifically configured to:
verify the second version of the first verification information based on the target second verification information; and
after verification of the second version of the first verification information succeeds, verify the owner information of the target domain name based on the second version of the first verification information.

In a possible implementation, the first indication information is specifically used to indicate that the first verification information is stored in the client, and that a version of the stored first verification information is a first version.

The first target verification information is the first verification information stored in the client.

The verification unit is specifically configured to:
verify the owner information of the target domain name based on the first version of the first verification information.

In a possible implementation, the second message is further used to indicate a version number of a second version.

The sending unit is further configured to send a third message to the server based on the version number of the second version, where the third message is used to indicate to request a latest version of the first verification information.

The receiving unit is further configured to receive a fourth message sent by the server based on the third message, where the fourth message includes the latest version of the first verification information, and store the latest version of the first verification information.

In a possible implementation, the first indication information is specifically used to indicate that the first verification information is not stored in the client.

The second message includes a second version of the first verification information and target second verification information, where the target second verification information is the second verification information used by the client to verify the second version of the first verification information, the second version is a latest version of the first verification information, and the second version of the first verification information is the target first verification information.

The verification unit is specifically configured to:
verify the second version of the first verification information based on the target second verification information; and
after verification of the second version of the first verification information succeeds, verify the owner information of the target domain name based on the second version of the first verification information.

In a possible implementation, the apparatus further includes a determining unit, configured to determine, based on stored verification information, to request partial information in the first verification information from the server.

The first message further includes second indication information, where the second indication information is used to indicate the client to request partial information in the second verification information.

The target second verification information in the second message is specifically the partial information in the target second verification information.

In a possible implementation, the second version is a latest generated version of the first verification information, or the second version is a version of the first verification information stored in a latest local snapshot.

In a possible implementation, the first verification information is verification information generated by a blockchain node based on the plurality of domain names and the owner information of the plurality of domain names, and the owner information of the target domain names is stored and maintained by a target smart contract account of a blockchain.

In a possible implementation, the first verification information is verification information generated by a blockchain node based on the plurality of domain names and the owner information of the plurality of domain names. The owner information of the target domain names is stored and maintained by a target smart contract account of a blockchain, and the second verification information is information in the blockchain.

According to a fifth aspect, an embodiment of this application provides an information verification device, including a processor, a memory, and a communications interface.

The processor controls receiving and sending actions of the communications interface.

The memory stores a program.

The processor invokes the program stored in the memory, to perform the method according to any one of the first aspect or the possible implementations of the first aspect.

According to a sixth aspect, an embodiment of this application provides an information verification device, including a processor, a memory, and a communications interface.

The processor controls receiving and sending actions of the communications interface.

The memory stores a program.

The processor invokes the program stored in the memory, to perform the method according to any one of the second aspect or the possible implementations of the second aspect.

According to a seventh aspect, an embodiment of this application provides a computer-readable storage medium. The computer-readable storage medium stores instructions, and when the instructions are run on a computer, the computer is enabled to perform the method according to the foregoing aspects.

According to an eighth aspect, an embodiment of this application further provides a computer program product including instructions. When the computer program product runs on a computer, the computer performs the method according to any one of the foregoing aspects.

Based on the information verification method, apparatus, and device provided in the embodiments of the present invention, the client sends the first message to the server, where the first message includes the target domain name and the first indication information. The server sends the second message to the client based on the first message, where the second message is used to indicate the target first verification information. The client verifies the obtained owner information of the target domain name based on the second message. This implements that the client verifies the owner information of the target domain name, further implements that the client verifies the server, and avoids the problem caused by unconditionally trusting the server by the client.

DESCRIPTION OF EMBODIMENTS

Figure 1:
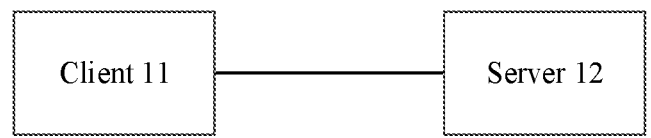
FIG. 1 is a schematic diagram of an application scenario according to an embodiment of this application.

FIG. 1 is a schematic diagram of an application scenario according to an embodiment of this application. As shown in FIG. 1, the application scenario may include a client 11 and a server 12. The client 11 and the server 12 are communicatively connected through the Internet. The client 11 may send a DNS request (query) message for a target domain name to the server 12. The client 11 may further verify owner information of the target domain name based on indications of the server 12. It should be noted that in the embodiments of this application, the client 11 may be understood as an entity device, and an application (App) (for example, a browser) that can trigger the entity device to send a DNS request message to the server 12 may be disposed on the entity device. Alternatively, the client 11 may be understood as an application, for example, a browser. The server 12 may be understood as a local server.

Figure 2:
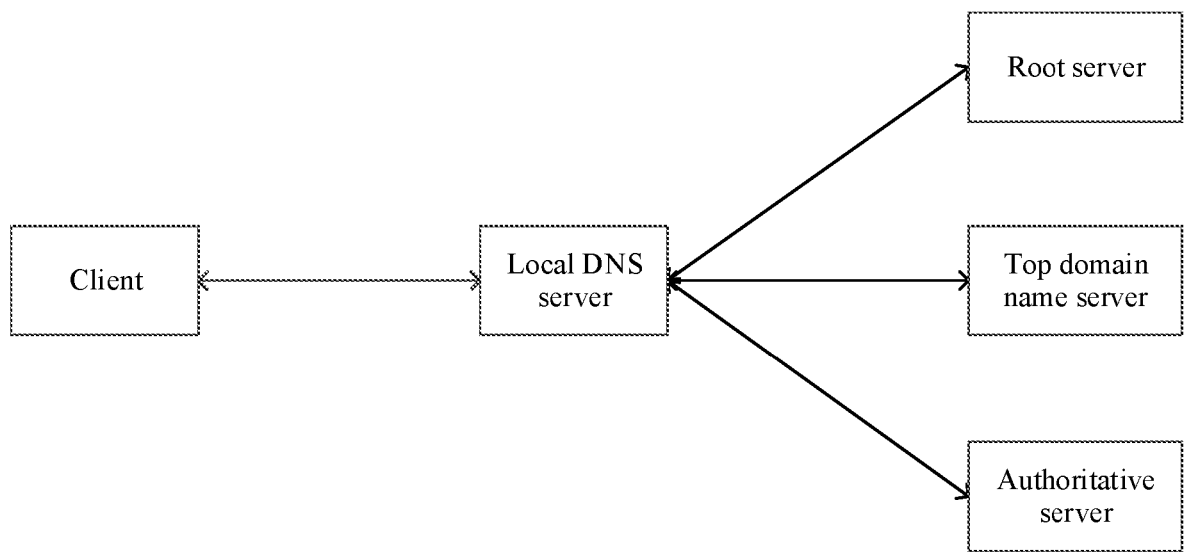
FIG. 2 is a schematic diagram of a principle of a DNS system in a related technology.

For example, a DNS system is shown in FIG. 2 and the target domain name is www.example.com. A specific processing process in a related technology is as follows: The client 11 may send a DNS request message of the client 11 for the target domain name www.example.com to a local DNS server. The local DNS server may send the DNS request message to a root server. The root server may return, based on the DNS request message, an address of a top domain name server responsible for a domain name.com to the local DNS server. The local DNS server may send, based on the address of the top domain name server of the domain name.com, the DNS request message to the top domain name server of the domain name.com. After receiving the DNS request message, the top domain name server may return an address of an authoritative server responsible for the domain name example.com to the local DNS server. Then, the local DNS server may send the DNS request message to the authoritative server based on the address of the authoritative server. The authoritative server may return an IP address of www.example.com to the local DNS server. Finally, the local DNS server may send, to the client 11, the IP address of www.example.com returned by the authoritative server.

It can be learned that the client 11 unconditionally trusts the local DNS server, the root server, the top domain name server, and the authoritative server, cannot verify the servers, and cannot determine authenticity of the received IP address. Once any one of the servers returns false information, the client 11 fails to access a real IP address of the target domain name.

In addition, to resolve a DNS centralization problem, domain name systems in which domain names are allocated and managed based on blockchains, such as a bitcoin-based blockstack naming system (BNS) and an Ethereum naming system (ENS), are also confronted with a problem that a client needs to trust a server unconditionally.

Figure 3:
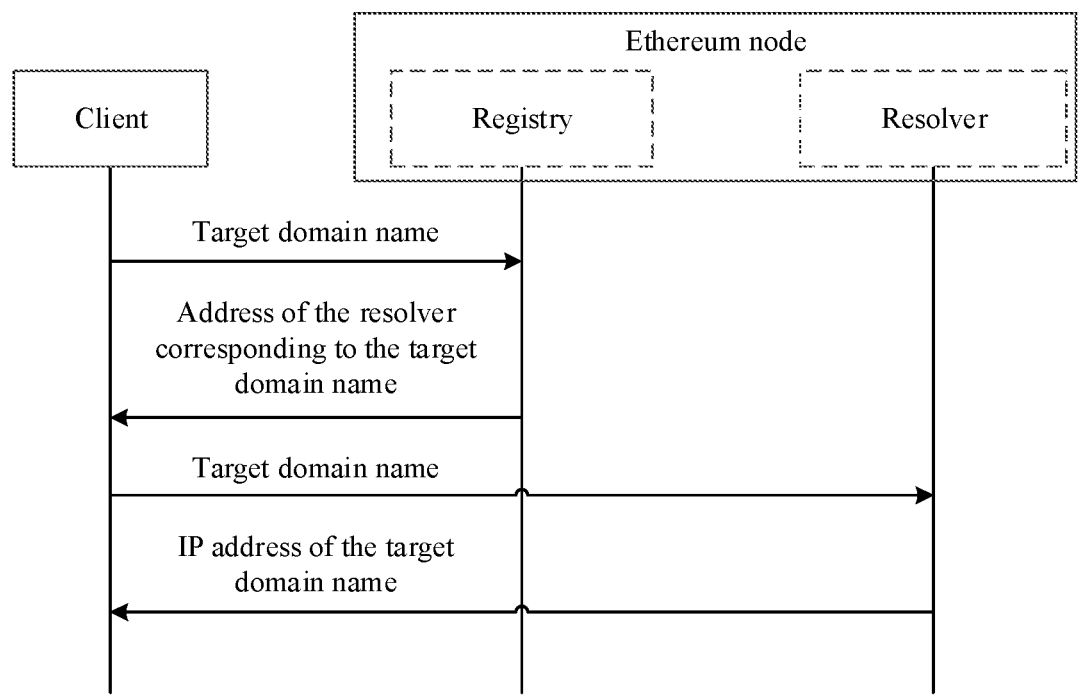
FIG. 3 is a schematic diagram of a principle of an ENS system in a related technology.

A basic principle of the ENS system may be shown in FIG. 3. Specifically, a registry is an Ethereum smart contract account and responsible for all domain name registration and transaction, and stores domain name-related information in a contract, where stored data is <name, owner, resolver>, where name represents a domain name, owner represents an Ethereum account of an owner of the domain name, and resolver represents a storage location (another smart contract account) of DNS information corresponding to the domain name. When the client needs to initiate a DNS request message, the client sends the DNS request message for the target domain name to the registry through an ENS-related application programming interface (API). The registry returns, to the client based on the DNS request message, an address of the resolver corresponding to the DNS target domain name. The client then initiates a DNS request message for the target domain name to the resolver based on the obtained address of the resolver. The resolver returns an IP address of the target domain name to the server based on the DNS request message. It should be noted that FIG. 3 uses an example that the registry and the resolver are a same Ethereum node, and the Ethereum node may be served as the server in FIG. 3.

Figure 4:
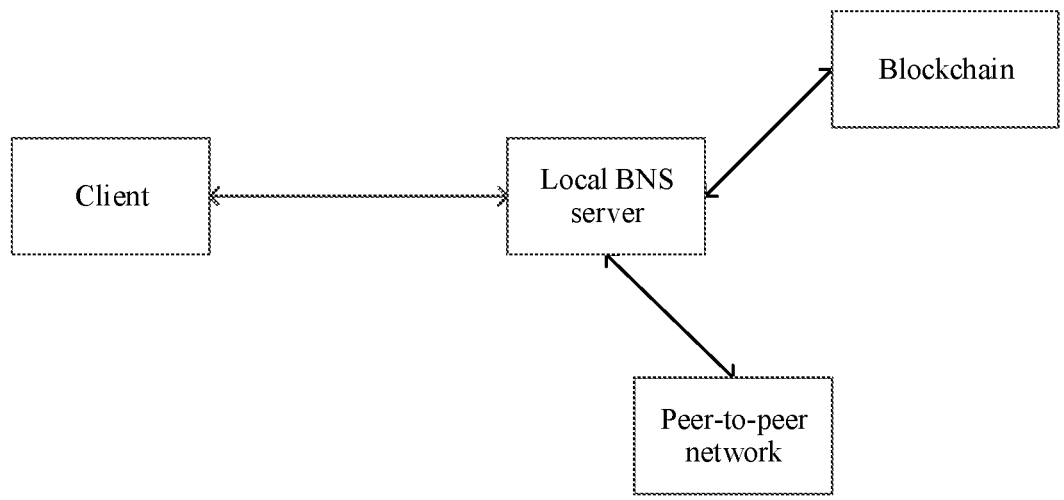
FIG. 4 is a schematic diagram of a principle of a BNS system in a related technology.

A basic principle of the BNS system may be shown in FIG. 4. Specifically, all domain name transactions are completed on a bitcoin network, final ownership and zone file information of a domain name are written into a bitcoin transaction, and information content is represented as <name, owner, hash>, where name represents a domain name, owner represents an owner of the domain name, and hash represents a hash of a zone file corresponding to the domain name. The client sends a request to a local BNS server to access a target domain name. The local BNS server synchronizes <name, owner, hash> information from a blockchain, downloads a zone file from a peer-to-peer network, and provides an IP address of the target domain name to the server based on the zone file.

It can be learned that the client still trusts the server unconditionally in the current domain name system in which domain names are allocated and managed based on blockchains. For example, the client unconditionally trusts the Ethereum node in FIG. 3, and the client unconditionally trusts the local BNS server in FIG. 4.

In the embodiments of this application, the client 11 verifies, based on indications of the server 12, the owner information of the target domain name, so that the server can be verified. This avoids the problem that the client cannot verify the server.

The following describes some implementations of this application in detail with reference to the accompanying drawings. In a case that no conflict occurs, the following embodiments and features in the embodiments may be mutually combined.

Figure 5:
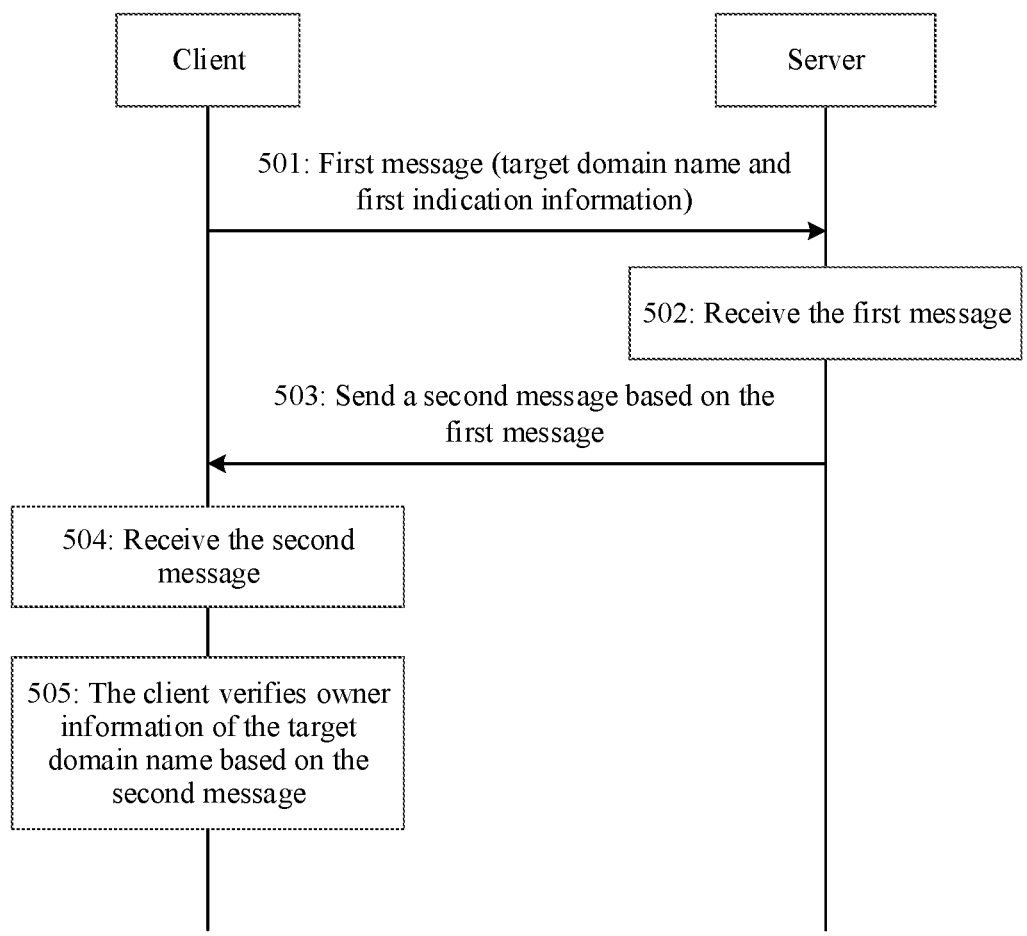
FIG. 5 is a schematic flowchart of an information verification method according to an embodiment of this application.

FIG. 5 is a schematic flowchart of an information verification method according to an embodiment of this application. This embodiment may be performed by a terminal device. As shown in FIG. 5, the method in this embodiment may include the following steps.

Step 501: A client sends a first message to a server, where the first message includes a target domain name and first indication information.

In this step, the first indication information is used to indicate a status of first verification information stored in the client. Specifically, the first indication information is specifically used to indicate that the first verification information is stored in the client, or the first indication information is specifically used to indicate that the first verification information is not stored in the client. Optionally, considering that the first verification information may be updated, when the first indication information is specifically used to indicate that the first verification information is stored in the client, the first indication information may be further used to indicate a version of the first verification information stored in the client (the version of the first verification information stored in the client may be recorded as a first version hereinafter).

Optionally, the first verification information stored in the client may be sent to the client by the server or another device other than the server before step 501.

Optionally, the client may consider that the first verification information received by the client is correct. Alternatively, optionally, the first verification information may be verified based on second verification information to improve verification strictness. In other words, the first verification information is verified by the client based on the second verification information. After the client verifies the first verification information based on the second verification information, the client may further verify a domain name by using the first verification information after the verification succeeds.

The first verification information is verification information generated based on a plurality of domain names and owner information of the plurality of domain names. The first verification information is used to verify the owner information of the plurality of domain names. The plurality of domain name include the target domain name. The first verification information may not only be used to verify owner information of the target domain name, but also may be used to verify owner information of one or more domain names other than the target domain name.

It should be noted that the owner information of the target domain name may be specifically any information that can uniquely identify an owner of the target domain name. Optionally, the owner information may include an owner public key (PK).

It should be noted that a specific manner in which the client sends the first message to the server is not limited in this application. For example, the client may send the first message to the server through the Internet, or the client may send the first message to the server through a Wireless Fidelity (Wi-Fi) network and the Internet.

Step 502: The server receives the first message sent by the client.

Step 503: The server sends a second message to the client based on the first message, where the second message is used to indicate target first verification information.

In this step, the target first verification information is used by the client to verify the owner information of the target domain name. It should be noted that the target first verification information may be one version of the first verification information in all versions of the first verification information. It may be understood that a version of the first verification information other than the first target verification information cannot be used by the client to verify the owner information of the target domain name. Alternatively, at least one version of the first verification information in versions of the first verification information other than the first target verification information may be used by the client to verify the owner information of the target domain name.

Based on different statuses of the first verification information stored in the client that are indicated by the first indication information, a specific manner in which the server sends the second message to the client based on the first message may include the following three cases.

Case 1: The first indication information is specifically used to indicate that the first verification information is not stored in the client.

The second message sent by the server to the client based on the first message includes: a second version of the first verification information, where the second version is a latest version of the first verification information. The second version of the first verification information is the target first verification information.

Optionally, in this embodiment of this application, the second version may be a latest generated version of the first verification information. The second version is the latest generated version of the first verification information, so that the client can obtain latest generated first verification information. Alternatively, the second version may be a version of the first verification information stored in a latest local snapshot. The second version is the version of the first verification information stored in the latest local snapshot, so that the server can store a snapshot of the first verification information. This can avoid a large amount of resource consumption caused if the server stores all the first verification information.

Optionally, when the first verification information is verified by the client based on second verification information, the second message further includes target second verification information, where the target second verification information is the second verification information used by the client to verify the second version of the first verification information.

Case 2: The first indication information is specifically used to indicate that the first verification information is stored in the client, but that the first indication information does not indicate a version of the first verification information stored in the client.

The target first verification information indicated by the second message sent by the server to the client based on the first message is the first verification information stored in the client. It may be understood that an amount of information exchanged between the client and the server can be reduced in a scenario in which the first verification information is not updated.

Case 3: The first indication information is specifically used to indicate that the first verification information is stored in the client, and that a version of the stored first verification information is a first version.

Step 503 may specifically include the following step A to step C.

Step A: The server determines, based on the first message, whether first owner information of the target domain name is the same as second owner information of the target domain name.

The first owner information is owner information of the target domain name that is used to generate the second version of the first verification information. The second owner information is owner information of the target domain name that is used to generate the first version of the first verification information. The second version is the latest version of the first verification information.

The first verification information may have the following features: For first verification information x and first verification information y, assuming that a domain name used to generate the first verification information x includes owner information a1 of a domain name a, owner information b1 of a domain name b, and owner information c1 of a domain name c, a result of verification performed on the owner information a1 of the domain name a by using the first verification information x is true, a result of verification performed on the owner information b1 of the domain name b by using the first verification information x is true, and a result of verification performed on the owner information c1 of the domain name c by using the first verification information x is true. Further, assuming that the owner information of the domain name a changes from a1 to a2, a result of verification performed on owner information a2 of the domain name a by using the first verification information x is false. Further, assuming that a domain name used to generate the first verification information y includes the owner information a2 of the domain name a, the owner information b1 of the domain name b, and the owner information c1 of the domain name c, a result of verification performed on the owner information a2 of the domain name a by using the first verification information y is true, a result of verification performed on the owner information b1 of the domain name b by using the first verification information y is true, and a result of verification performed on the owner information c1 of the domain name c by using the first verification information y is true.

In other words, if the owner information of the target domain name that is used to generate the latest first verification information (namely, the second version of the first verification information) is the same as the owner information of the target domain name that is used to generate the first verification information (namely, the first version of the first verification information) stored in the client, the first verification information stored in the client can be used to verify current owner information of the target domain name. If the owner information of the target domain name used to generate the latest first verification information is different from the owner information of the target domain name used to generate the first verification information stored in the client, the first verification information stored in the client cannot be used to verify the current owner information of the target domain name.

Therefore, it is determined, based on whether the owner information of the target domain name used to generate the second version of the first verification information is the same as the owner information of the target domain name used to generate the first version of the first verification information, whether the client verifies the owner information of the target domain name by using the first version of the first verification information (namely, the following step C), or verifies the owner information of the target domain name by using the second version of the first verification information (namely, the following step B).

It should be noted that a specific manner of implementing the first verification information is not limited in this application. Optionally, the first verification information may be implemented by using a bloom filter.

Step B: The server sends the second message to the client if the first owner information of the target domain name is different from the second owner information of the target domain name, where the second message includes the second version of the first verification information, and the second version of the first verification information is the target first verification information.

Optionally, when the first verification information is verified by the client based on second verification information, the second message further includes target second verification information, where the target second verification information is the second verification information used by the client to verify the second version of the first verification information.

Step C: The server sends the second message to the client if the first owner information of the target domain name is the same as the second owner information of the target domain name, where the target first verification information is the first verification information stored in the client.

According to the foregoing step A to step C, when the owner information of the target domain name that is used to generate the latest first verification information (namely, the second version of the first verification information) is the same as the owner information of the target domain name that is used to generate the first verification information (namely, the first version of the first verification information) stored in the client, the client may verify the owner information of the target domain name by using the first verification information stored in the client. This avoids the following problem: A speed of accessing the target domain name by the client is relatively slow because the client needs to re-obtain latest first verification information from the server if there is a change in owner information that is of a non-target domain name and that is used to generate the first verification information.

In step C, optionally, the second message is further used to indicate a version number of the second version, so that the client may learn of a latest version of the first verification information based on the second message, and further determine, based on the second message, to request latest first verification information from the server. This improves flexibility of obtaining the first verification information by the client.

Correspondingly, the method in this embodiment may further include the following step C1 to step C4.

Step C1: The client sends a third message to the server based on the version number of the second version, where the third message is used to indicate to request a latest version of the first verification information.

Optionally, the client may send, based on the version number of the second version, the third message to the server when a specific condition is met. For example, the client may send, based on the version number of the second version, the third message to the server when usage of a central processing unit (CPU) of the client is less than or equal to a specific threshold. For another example, the client may send, based on the version number of the second version, the third message to the server when the client is idle.

Step C2: The server receives the third message from the client.

Step C3: The server sends a fourth message to the client based on the third message, where the fourth message includes the latest version of the first verification information.

Step C4: The client receives the fourth message, and stores the latest version of the first verification information included in the fourth message.

Optionally, to reduce an amount of information exchanged between the server and the client, before the client sends the first message to the server, the method may further include: The client determines, based on stored verification information, to request partial information in the first verification information from the server. Correspondingly, the first message further includes second indication information, where the second indication information is used to indicate the client to request partial information in the second verification information. The target second verification information in the second message is specifically the partial information in the target second verification information. For example, the second verification information may include a total of four parts of information: a part m1, a part m2, a part m3, and a part m4. The second indication information may be used to indicate the client to request the part m1 and the part m2 in the second verification information (namely, partial information). Correspondingly, the target second verification information included in the second message may be specifically the part m1 and the part m2 in the target second verification information.

For example, the client may determine, based on the stored verification information, to obtain information in the second version of the first verification information other than the partial information. Alternatively, for example, the client may determine, based on the stored first verification information of the first version, that the partial information in the first version of the first verification information is the same as the partial information in the second version of the first verification information.

Step 504: The client receives the second message.

Step 505: The client verifies the obtained owner information of the target domain name based on the second message.

In this step, the client may obtain the owner information of the target domain name from the server.

Corresponding to step 503, for case 1, step 505 may specifically include: The client verifies the owner information of the target domain name based on the second version of the first verification information. Optionally, when the second message further includes the target second verification information, before the client verifies the owner information of the target domain name based on the second version of the first verification information, the method further includes: The client verifies the second version of the first verification information based on the target second verification information.

For case 2, step 505 may specifically include: The client verifies the owner information of the target domain name based on the first version of the first verification information.

For case 3, if the second message includes the second version of the first verification information, step 505 may specifically include: The client verifies the owner information of the target domain name based on the second version of the first verification information. Optionally, if the second message further includes the target second verification information, step 505 may specifically include: The client verifies the second version of the first verification information based on the target second verification information, and the client verifies the owner information of the target domain name based on the second version of the first verification information after the verification of the second version of the first verification information succeeds.

For case 3, if the target first verification information is the first verification information stored in the client, step 505 may specifically include: The client verifies the owner information of the target domain name based on the first version of the first verification information.

Optionally, the client may determine, based on a result of verification performed by the client on the owner information of the target domain name, authenticity of an IP address that is of the target domain name and that is obtained from the server. The result of the verification performed by the client on the owner information of the target domain name may be specifically that the verification succeeds or the verification fails.

Optionally, when the result of the verification performed by the client on the owner information of the target domain name is that the verification fails, the client may determine that the IP address obtained from the server is not a real IP address of the target domain name.

Optionally, when the result of the verification performed by the client on the owner information of the target domain name is that the verification succeeds, the client may verify, based on the owner information of the target domain name, the IP address obtained from the server.

For example, the client may perform, based on the owner information of the target domain name, signature verification on the IP address of the target domain name. When a result of the signature verification performed on the IP address of the target domain name is true, the client may determine that the IP address is a real IP address of the target domain name. When a result of the signature verification performed on the IP address of the target domain name is false, the client may determine that the IP address is not a real IP address of the target domain name.

For example, the client may perform, based on the owner information of the target domain name, signature verification on another PK signed by the owner of the target domain name, for example, a DNS key (DNSKEY). When a result of the signature verification performed on the another PK signed by the owner of the target domain name is false, the client may determine that the IP address is not a real IP address of the target domain name. When a result of the signature verification performed on the another PK signed by the owner of the target domain name is true, the client may perform signature verification on the IP address of the target domain name based on the another PK signed by the owner. When a result of the signature verification performed on the IP address of the target domain name is true, the client may determine that the IP address is a real IP address of the target domain name. When a result of the signature verification performed on the IP address of the target domain name is false, the client may determine that the IP address is not a real IP address of the target domain name.

It should be noted that specific manners of verifying the first verification information based on the second verification information and verifying the owner information of the target domain name based on the first verification information is not limited in this application.

In this embodiment, the client sends the first message to the server, where the first message includes the target domain name and the first indication information. The server sends the second message to the client based on the first message, where the second message is used to indicate the target first verification information. The client verifies the obtained owner information of the target domain name based on the second message. This implements that the client verifies the owner information of the target domain name, and further implements that the client verifies the server, and avoids the problem caused by unconditionally trusting the server by the client.

Figure 6:
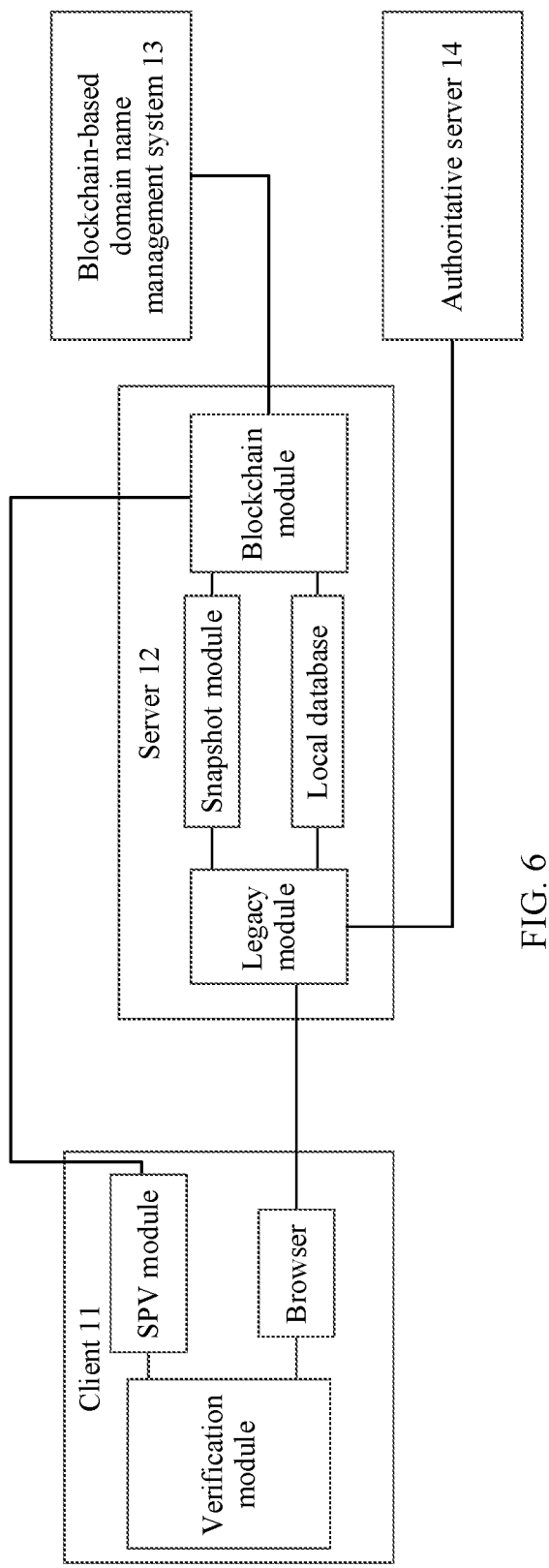
FIG. 6 is a schematic diagram of a system architecture to which an embodiment of this application is applied.

For example, a domain name system in which domain names are allocated and managed based on blockchains is used, and the first verification information is verified based on the second verification information. A system architecture to which this embodiment of this application is applied may be shown in FIG. 6. As shown in FIG. 6, the system architecture may include a client 11, a server 12, a blockchain-based domain name management system 13, and an authoritative server 14.

For example, the client 11 is an entity device. For example, the client 11 may include a browser, a verification module, and a simplified payment verification (SPV) module. The verification module may verify ownership information based on a first verification information, and verify the first verification information based on second verification information. The SPV module may be configured to verify the second verification information based on an SPV technology. It should be noted that, for a specific manner of verifying the second verification information based on the SPV technology, refer to the SPV technology in the related technology. Details are not described herein.

For example, the server 12 may include a legacy module, a blockchain (BC) module, a snapshot module, and a local database. The legacy module may be configured to provide functions of the local DNS server shown in FIG. 2. The blockchain module may provide a blockchain function, and is used by the server to synchronize a domain name and owner information of the domain name from the blockchain-based domain name management system 13, and stores the synchronized domain name and owner information into the local database. The snapshot module may be configured to store snapshots of all verification information of the blockchain-based domain name management system at some historical moments, and obtain verification information in a corresponding snapshot based on a request of the client. For example, all the verification information may include the first verification information, owner information of domain names, an Ethereum storage trie, Ethereum contract account information, an Ethereum state trie, and the like.

The blockchain-based domain name management system 13 may implement domain name-related functions such as application and transaction based on blockchains, and store owner information of the domain names. For example, information externally provided by the blockchain-based domain name management system may be <name, owner PK, IP address of an authoritative server>, where name represents a domain name, and owner PK represents a public key provided by an owner of the domain name. For example, owner information of an Ethereum domain name may be stored in a smart contract. It should be noted that a specific manner of storing owner information of a domain name is not limited in this application.

The authoritative server 14 may store a mapping relationship <name, IP> and resource records (RRs) other than names and IPs, where name represents a domain name, and IP represents an IP address of the domain name. The owner of the domain name may place the RRs of the domain name on a self-deployed authoritative server or on a third-party server that provides an authoritative server function. Optionally, the RRs of the domain name may be signed by using an owner PK or a secret key (SK) corresponding to another PK signed by the owner PK, to verify information stored in the authoritative server 14.

Based on FIG. 6, optionally, the first verification information is verification information generated by a blockchain node based on plurality of domain names and owner information of the plurality of domain names, and owner information of the target domain names is stored and maintained by a target smart contract account of a blockchain. The first verification information is generated by the blockchain node, so that the blockchain node can maintain the verification information, thereby improving flexibility of maintaining the verification information. The blockchain node may be a computer in a blockchain network. For example, the blockchain node may include a mobile phone, a mining rig, a desktop computer, a server, and the like.

It should be noted that the blockchain node in this embodiment of this application may be the server or an entity other than the server. This is not limited in this application.

Further, optionally, the second verification information may be information in the blockchain. The second verification information is information in the blockchain, so that a blockchain-based SPV technology can ensure correctness of the second verification information. It may be understood that the second verification information may alternatively not be the information in the blockchain if the blockchain-based technology is not considered to be used to ensure correctness of the second verification information.

For example, the first verification information may be generated in the following manner:

First, a quantity and a size of bloom filters may be determined. Optionally, for example, a deployer of a smart contract may write the quantity and the size of the bloom filters into code, or the deployer may configure, by enhancing Ethereum EVMs (Ethereum virtual machines), the quantity and the size of the bloom filters while parameters are transferred during deployment.

Then, all the bloom filters may be numbered. For example, as shown in FIG. 7, there may be three bloom filters with numbers BF1, BF2, and BF3.

Figure 7:
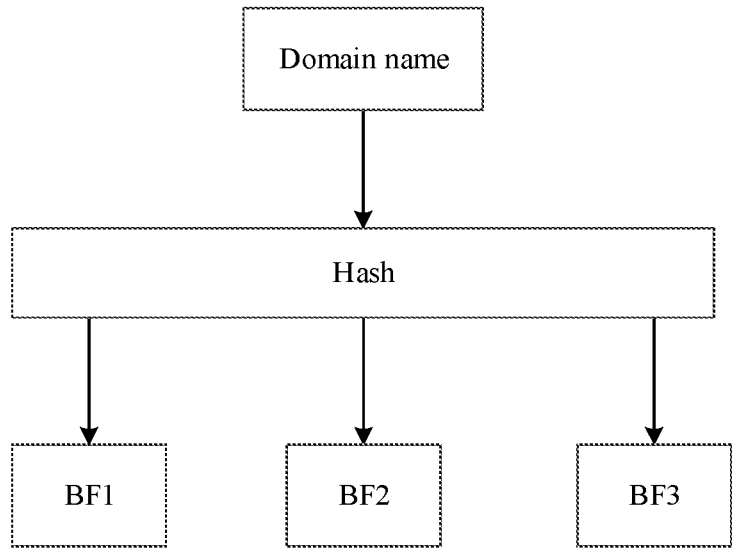
FIG. 7 is a schematic diagram of generating a bloom filter according to an embodiment of this application.

Then, as shown in FIG. 7, a hash operation may be performed on domain names by using a number interval of the bloom filters as an output interval, to uniquely map a domain name to a bloom filter.

Finally, as shown in FIG. 7, the domain name and owner information of the domain name may be used as a key-value pair as input of the bloom filter to which the domain name is mapped (for example, the bloom filter numbered BF2). The bloom filter to which the domain name is mapped is modified. It should be noted that, when implementation is based on bloom filters, to enable a deletion operation, a counting-BF may be used, that is, additional storage space for counting may be created for each bit of the BF.

The modified bloom filter may be used as the first verification information.

Figure 8:
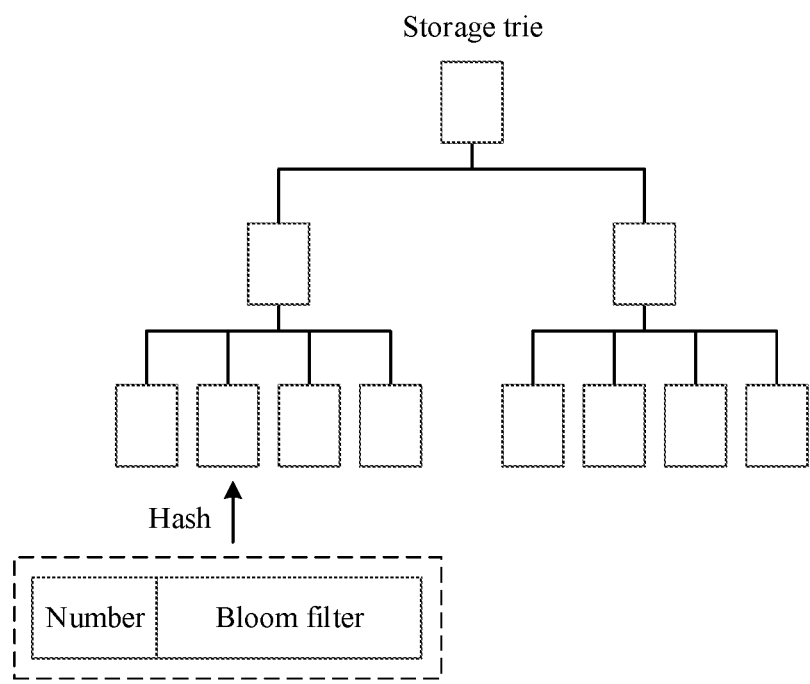
FIG. 8 is a schematic diagram of a relationship between a bloom filter and a storage trie according to an embodiment of this application.

Then, for example, as shown in FIG. 8, the modified bloom filter of the domain name and a number of the bloom filter together may be used as a global variable for generating a storage trie of a smart contract account corresponding to the domain name. It should be noted that FIG. 8 merely uses an example that a number is in front of a bloom filter. For example, the second verification information may include: block header information of a block in which a version corresponding to the second verification information is located, owner information of the target domain name, a Merkle path of a storage trie of the version corresponding to the second verification information, a Merkle path of a state trie of the version corresponding to the second verification information, and parameters other than a value of a root node of the storage trie in all parameters of the target smart contract account that are used for generating the state trie.

Figure 9:
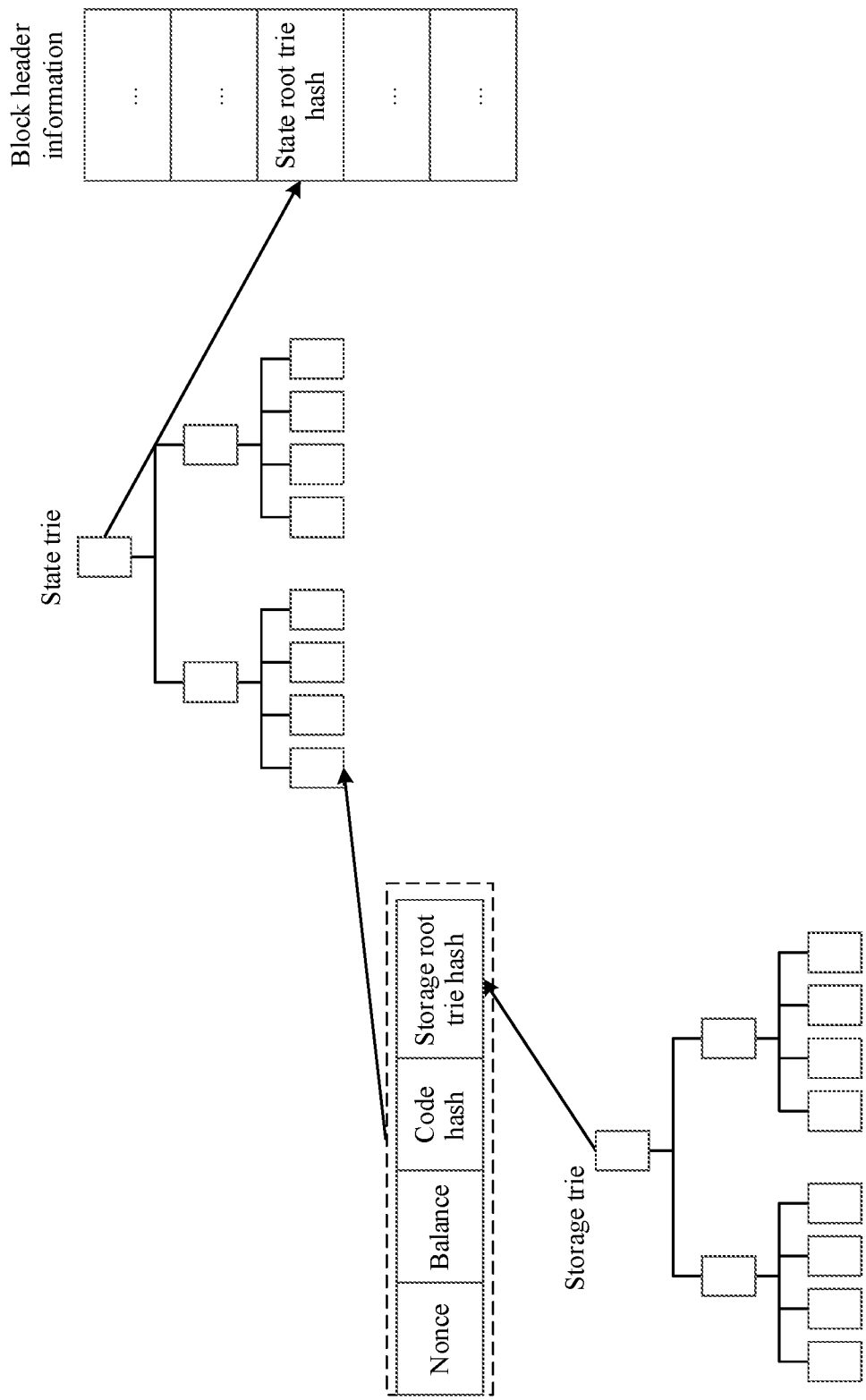
FIG. 9 is a schematic diagram of a relationship between a storage trie and an SPV manner according to an embodiment of this application.

The storage trie may be information in an Ethereum-based SPV manner, and specific descriptions of information about the storage trie in the SPV manner may be shown in FIG. 9. As shown in FIG. 9, in the Ethereum-based SPV manner, block header information needs to be used, and the block header information may include a state root trie hash. Each leaf node in the state trie may correspond to one smart contract account, and one smart contract account may include a storage root trie hash of the smart contract account. A value of a leaf node in the storage trie of the smart contract account may be a value of a variable in variables of the smart contract account, and leaf nodes are in a one-to-one correspondence with variables. The variables may include the modified bloom filter and the number of the modified bloom filter, which are used as a global variable.

As shown in FIG. 9, for example, the parameters other than the value of the root node of the storage trie in all the parameters of the target smart contract account that are used for generating the state trie may specifically include: a nonce, a balance, and a code hash.

It should be noted that, for other information in the block header information in FIG. 9, refer to descriptions in a related technology. Details are not described herein.

It should be noted that a value of a non-leaf node of the state trie or the storage trie is a result obtained by performing a hash operation on a lower-level node of the non-leaf node.

Figure 10:
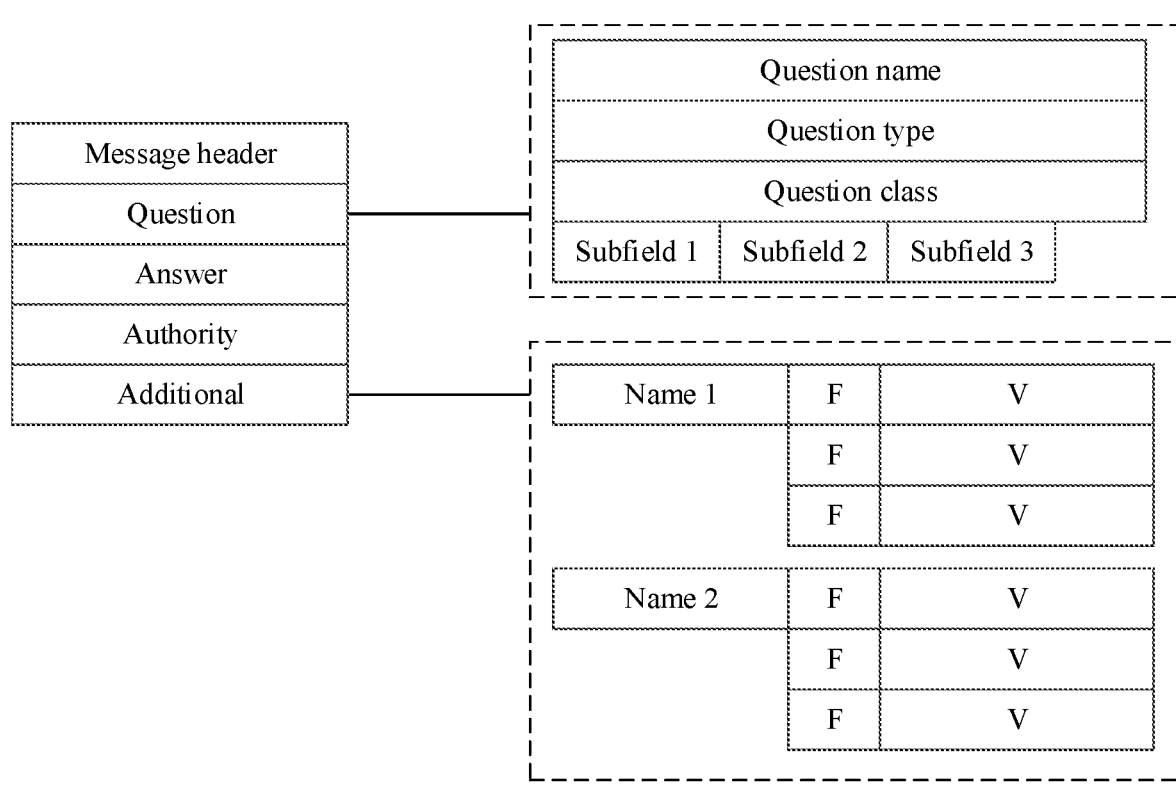
FIG. 10 is a schematic diagram of a packet format according to an embodiment of this application.

Further, for example, the first message includes the first indication information and the second indication information, the first message is a DNS request message, and a format of the DNS request message may be shown in FIG. 10.

As shown in FIG. 10, in an existing DNS standard, a DNS request message and a DNS response message have a same packet format, and both may include five fields: a header field, a question field, an answer field, an authority information field, and an additional field. In this embodiment of this application, the question field and the additional field may be extended.

The question field is a target domain name that needs to be specified when a client sends the DNS request message. Each target domain name may correspond to three subfields: a question name (QNAME), a question type (QTYPE), and a question class (QCLASS). For example, the following three fields may be added after the question class subfield of each target domain name: a subfield 1, a subfield 2, and a subfield 3. It should be noted that, for specific content of the three subfields: question name (QNAME), question type (QTYPE), and question class (QCLASS), refer to related descriptions in the existing DNS standard. Details are not described herein.

For example, the subfield 1 may be referred to as a T field, and may occupy two bits. A first bit may indicate a requirement for DNS information, and a second bit may be used to indicate a requirement for verification information.

For example, when a value of the subfield 1 is 11, it may indicate that an IP address of the target domain name is requested, and verification information is requested. When a value of the subfield 1 is 10, it may indicate that an IP address of the target domain name is requested but verification information is not requested, and the subfield 2 and the subfield 3 may not be presented. When a value of the subfield 1 is 01, it may indicate that owner information is requested and verification information is requested. When a value of the subfield 1 is 00, it may indicate that owner information is requested but verification information is not requested, and the subfield 2 and the subfield 3 may not be presented.

For example, the subfield 2 may be referred to as an indicator field, and may be an 8-bit bitmap. For example, a first bit may be reserved, a second bit may indicate whether the first verification information is buffered in the client currently, and each of a third bit to an eighth bit may indicate a requirement for a corresponding part of six parts of the verification information. When a bit is 1, it may indicate that information about a corresponding part is requested; when a bit is 0, it may indicate that information about a corresponding part is not requested.

For example, the second bit may be referred to as a state indicator (State indicator) bit. If the state indicator bit is 1, it may indicate that the first verification information is buffered in the client, and a version number (namely, a version number of the first version) of the first verification information currently buffered in the client may be written into the subfield 3. If the state indicator bit is 0, it may indicate that the client does not buffer the first verification information, and the subfield 3 may not be presented. The state indicator bit and the subfield 3 may correspond to the first indication information.

For example, the third bit may be referred to as an owner public key (Owner PK) bit, and is used to indicate a requirement for the owner information of the target domain name. The owner public key bit may be used by the client to request the owner information of the target domain name from the server.

For example, the fourth bit may be referred to as a bloom filter bit, and is used to indicate a requirement for a bloom filter.

For example, the fifth bit may be used to indicate a requirement for a storage trie Merkle path of a version corresponding to the second verification information.

For example, the sixth bit may be used to indicate a requirement for the parameters other than the value of the root node of the storage trie in all the parameters of the target smart contract account that are used for generating the state trie.

For example, the seventh bit may be used to indicate a requirement for a state trie Merkel path of the version corresponding to the second verification information.

For example, the eighth bit may be used to indicate a requirement for block header information of a block in which the version corresponding to the second verification information is located.

It should be noted that the third bit and the fifth bit to the eighth bit in the subfield 2 may correspond to the second indication information.

For example, the subfield 3 may be referred to as an <L, V> field. For a DNS request message, the subfield 3 may be used to indicate a version of the first verification information stored in the client; for a DNS response message, the subfield 3 may be used to indicate a latest version of the first verification information.

The additional field indicates some additional information about the target domain name in the DNS response message, and may be used for placing of verification information in this application. For example, as shown in FIG. 10, a format of the additional field for placing of verification information may be as follows: name+verification information. For example, a sequence of the verification information may be based on requirements in the DNS request message. For example, if values of the third bit to the fifth bit of the subfield 2 in the DNS request message are all 1, and values of the sixth bit to the eighth bit are all 0, a first format of name+verification information in the additional field may represent the owner information of the target domain name, a second format of name+verification information may represent the bloom filter, and a third format of name+verification information may represent the storage trie Merkel path of the version corresponding to the second verification information.

For example, in the format of name+verification information, the verification information may be encapsulated in an <F, V> manner. If F is 0, it may indicate that V represents a value of the verification information. If F is 1, it may indicate that V represents a domain name.

It should be noted that the question field may be a target domain name specified when the client sends the DNS request message. The DNS request message may include the question field, but do not include the additional field. The DNS response message may include the additional field and the subfield 2 corresponding to the verification information included in the additional field.

It should be noted that FIG. 9 uses an example in which there are two target domain names: a name 1 and a name 2.

It should be noted that the first message is merely an example DNS request message.

For example, to simplify implementation of the server, the server may store the first verification information and the second verification information at a specific snapshot interval. For example, a block height of a blockchain may be used as a version number of the first verification information. It should be noted that an implementation of the version number of the first verification information is not limited in this embodiment of this application.

For example, a snapshot interval of the server is 10 (that is, the first verification information is stored in a snapshot every 10 block heights), a maximum quantity of snapshots is 3 (that is, a maximum of three snapshots are stored), and the first message is a DNS request message, specific implementation in which the client obtains verification information from the server is illustrated in the following three scenarios.

Scenario 1: The client does not buffer the first verification information (namely, a bloom filter of the target domain name).

Figure 11:
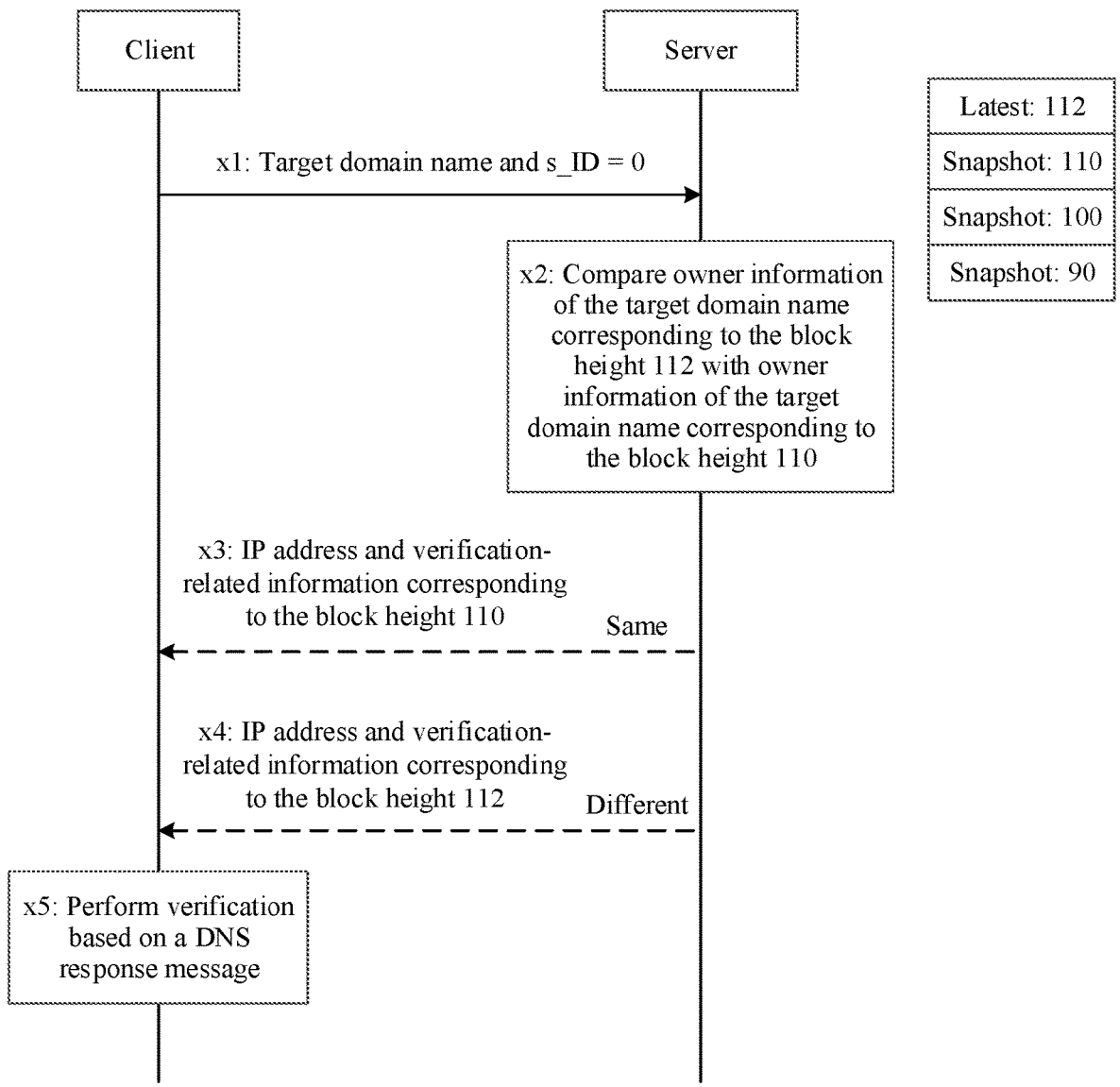
FIG. 11 is a schematic diagram in which a client obtains verification information in a scenario 1 according to an embodiment of this application.

As shown in FIG. 11, a latest block height in a blockchain is 112, the server stores, in a snapshot, the first verification information and the second verification information that correspond to a block height 90, a block height 100, and a block height 110; and the client does not buffer the first verification information.

Step x1: The client sends a DNS request message for the target domain name to the server, where a value of a state indicator bit equal to 0 (which may be denoted as s ID=0 hereinafter) may indicate that the client does not store the first verification information.

A value of the subfield 1 in the DNS request message may be a binary value of 11, and a value of the subfield 2 may be a binary value of 00111111 (indicating that the client requires the first verification information and all information in the second verification information).

Step x2: After receiving the DNS request message, the server may search for a local database, and compare owner information of the target domain name corresponding to the block height 112 with owner information of the target domain name corresponding to the block height 110.

Step x3: If the owner information of the target domain name corresponding to the block height 112 is the same as the owner information of the target domain name corresponding to the block height 110, the server may encapsulate an IP address (which may be obtained from an authoritative server) of the target domain name and verification-related information corresponding to the block height 110 into a DNS response message to return to the client.

For example, the verification-related information corresponding to the block height 110 may include: the owner information of the target domain name corresponding to the block height 110, a bloom filter (namely, the first verification information) corresponding to the target domain name corresponding to the block height 110, and second verification information for verifying the bloom filter corresponding to the target domain name corresponding to the block height 110.

Step x4: If the owner information of the target domain name corresponding to the block height 112 is different from the owner information of the target domain name corresponding to the block height 110, the server may encapsulate an IP address of the target domain name and the verification-related information corresponding to the block height 112 into a DNS response message to return to the client.

For example, the verification-related information corresponding to the block height 112 may include: the owner information of the target domain name corresponding to the block height 112, a bloom filter (namely, the first verification information) corresponding to the target domain name corresponding to the block height 112, and second verification information for verifying the bloom filter corresponding to the target domain name corresponding to the block height 112.

Step x5: After receiving the DNS response message, the client performs verification based on the DNS response message.

Specifically, the client may verify the first verification information based on the second verification information, store the first verification information when the verification succeeds; and verify the obtained owner information of the target domain name based on the first verification information obtained after the verification succeeds.

In the DNS response message, a value of the subfield 1 may be a binary value of 11, and a value of the subfield 2 may be a binary value of 01111111. The value of the subfield 2 equal to the binary value of 01111111 may indicate that the server returns the first verification information and all information in the second verification information.

Scenario 2: The client buffers the first verification information stored in a latest snapshot.

Figure 12:
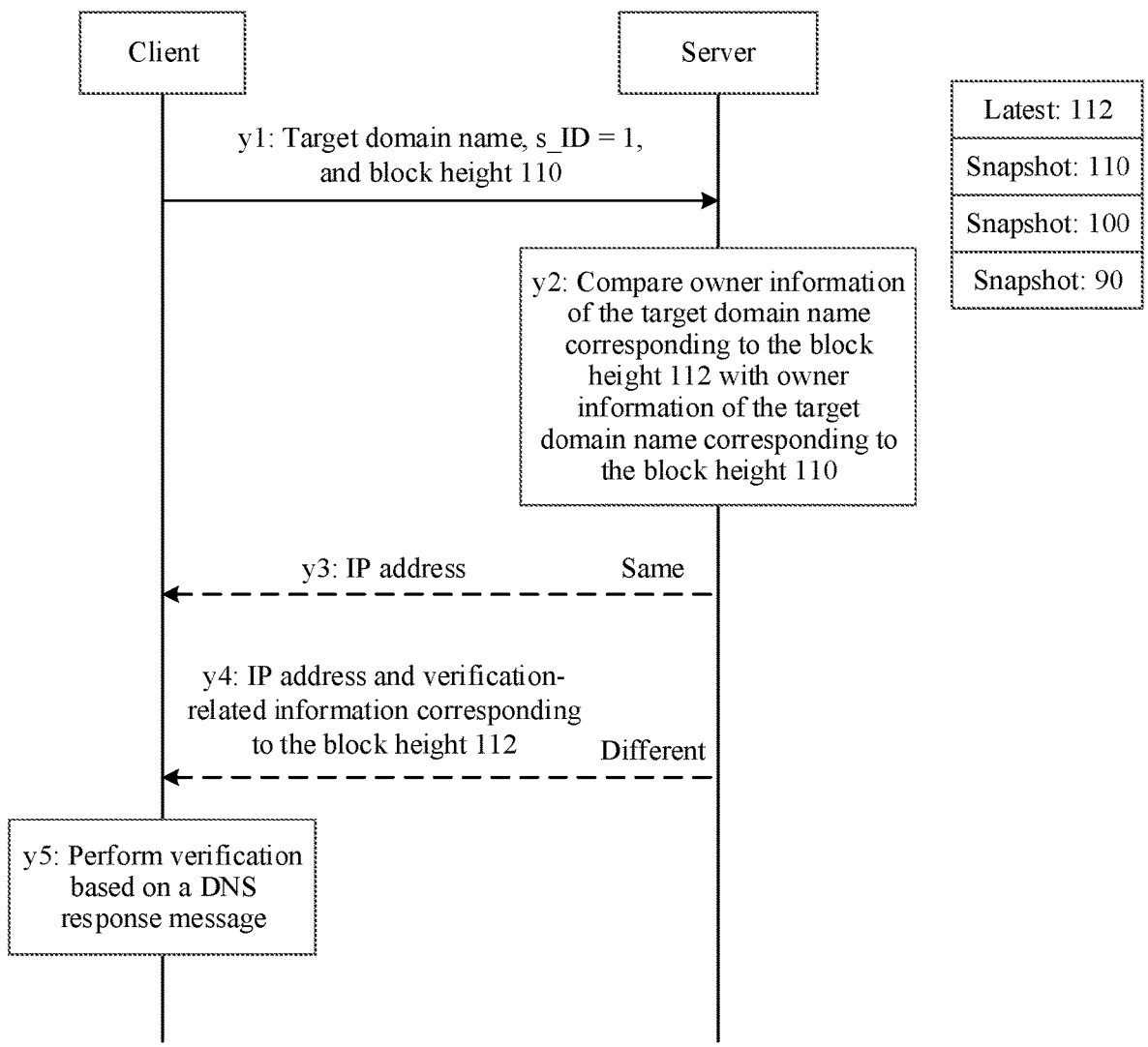
FIG. 12 is a schematic diagram in which a client obtains verification information in a scenario 2 according to an embodiment of this application.

As shown in FIG. 12, a latest block height in a blockchain is 112, the server stores first verification information and second verification information corresponding to a block height 90, a block height 100, and a block height 110; and the client buffers the first verification information corresponding to the block height 110. Optionally, the client may further buffer the second verification information corresponding to the block height 110.

Step y1: The client sends a DNS request message for the target domain name to the server, where s ID=1, and a value of the field 3 equal to a decimal value of 110 may indicate that a block height corresponding to the first verification information stored in the client is 110.

A value of the subfield 1 in the DNS request message may be a binary value of 11, and a value of the subfield 2 may be a binary value of 01000000 (indicating that the client has the first verification information and the second verification information that correspond to the block height 110).

Step y2: After receiving the DNS request message, the server may search for a local database, and compare owner information of the target domain name corresponding to the block height 112 with owner information of the target domain name corresponding to the block height 110.

Step y3: If the owner information of the target domain name corresponding to the block height 112 is the same as the owner information of the target domain name corresponding to the block height 110, the server may encapsulate an IP address of the target domain name into a DNS response message to return to the client.

A value of the subfield 1 in the DNS response message may be a binary value of 11, and a value of the subfield 2 may be a binary value of 01000000. The value of the subfield 2 equal to the binary value of 01000000 may indicate that the server does not add verification information to the additional field.

Step y4: If the owner information of the target domain name corresponding to the block height 112 is different from the owner information of the target domain name corresponding to the block height 110, the server may encapsulate an IP address of the target domain name and verification-related information corresponding to the block height 112 into a DNS response message to return to the client.

Optionally, the verification-related information corresponding to the block height 112 may include: the owner information of the target domain name corresponding to the block height 112, a bloom filter corresponding to the target domain name corresponding to the block height 112, and second verification information for verifying the bloom filter corresponding to the target domain name corresponding to the block height 112. A value of the subfield 1 in the DNS response message may be a binary value of 11, and a value of the subfield 2 may be a binary value of 01111111. The value of the subfield 2 equal to the binary value of 01111111 may indicate that verification information buffered in the client is unavailable, and the server returns the first verification information and all information in the second verification information.

Alternatively, the verification-related information corresponding to the block height 112 may include: the owner information of the target domain name corresponding to the block height 110 and the block height 112, a bloom filter corresponding to the target domain name, and differential verification information of second verification information for verifying the bloom filter corresponding to the target domain name.

Step y5: After receiving the DNS response message, the client performs verification based on the DNS response message.

Specifically, if the DNS response message includes the verification-related information corresponding to the block height 112, step y5 may specifically include: The client may verify the first verification information based on the second verification information corresponding to the block height 112; store the first verification information corresponding to the block height 112 when the verification succeeds; and verify the obtained owner information of the target domain name based on the first verification information corresponding to the block height 112 obtained after the verification succeeds.

If the DNS response message does not include the verification-related information corresponding to the block height 112, step y5 may specifically include: The client verifies the obtained owner information of the target domain name based on the buffered first verification information corresponding to the block height 110.

Scenario 3: The client buffers the first verification information, but the first verification information buffered by the client is not first verification information stored in a latest snapshot.

Figure 13:
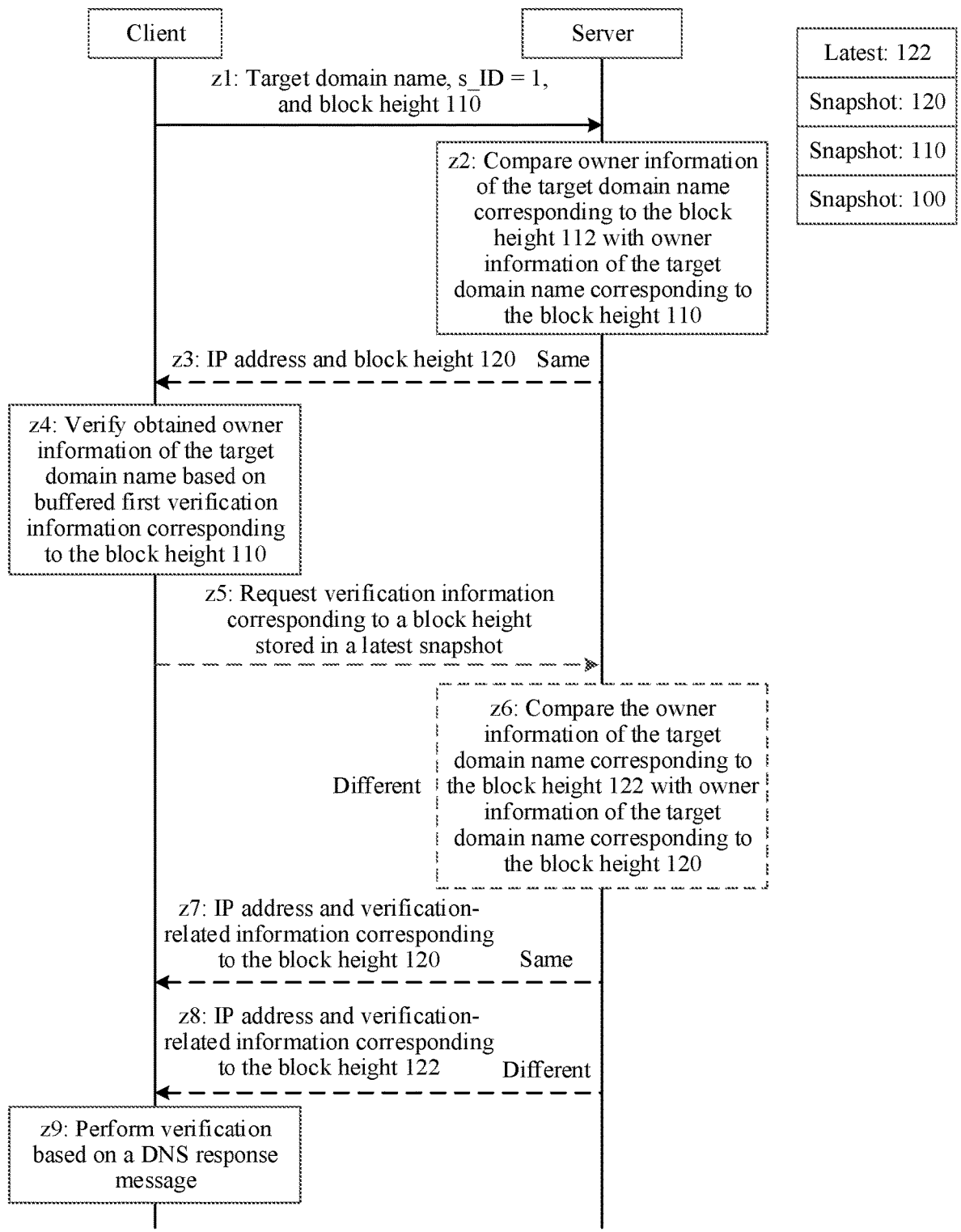
FIG. 13 is a schematic diagram in which a client obtains verification information in a scenario 3 according to an embodiment of this application.

As shown in FIG. 13, a latest block height in a blockchain is 122, the server stores, in a snapshot, first verification information and second verification information corresponding to a block height 100, a block height 110, and a block height 120; and the client buffers the first verification information corresponding to the block height 110. Optionally, the client may further buffer the second verification information corresponding to the block height 110.

Step z1: The client sends a DNS request message for the target domain name to the server, where s ID=1, and a value of the field 3 equal to a decimal value of 110 may indicate that the client stores a bloom filter of the target domain name corresponding to the block height 110.

A value of the subfield 1 in the DNS request message may be a binary value of 11, and a value of the subfield 2 may be a binary value of 01000000 (indicating that the client has all required verification information corresponding to the block height 110).

Step z2: After receiving the DNS request message, the server may search for a local database, and compare owner information of the target domain name corresponding to the block height 122 with owner information of the target domain name corresponding to the block height 110.

Step z3: If the owner information of the target domain name corresponding to the block height 122 is the same as the owner information of the target domain name corresponding to the block height 110, the server may encapsulate an IP address of the target domain name and the block height 120 into a DNS response message to return to the client.

In the DNS response message, a value of the subfield 1 may be a binary value of 11, a value of the subfield 2 may be a binary value of 01000000, and <L, V> may be a decimal value of 120. The value of the subfield 2 equal to the binary value of 01000000 may indicate that the server does not add verification information to the additional field. The decimal value of <L, V> equal to 120 may indicate that a latest snapshot of the server stores verification information (namely, the first verification information and the second verification information) corresponding to the block height 120.

After step z3, the following step z4 may be performed.

Step z4: After receiving the DNS response message, the client verifies the obtained owner information of the target domain name based on the buffered first verification information corresponding to the block height 110.

Optionally, after step z4, the following step z5 may be performed.

Step z5: After receiving the DNS response, the client requests, from the server based on the block height 120, the verification information corresponding to a block height stored in the latest snapshot, to obtain, from the server, the verification information corresponding to the block height stored in the latest snapshot.

It should be noted that the process ends after step z5.

Step z6: If the owner information of the target domain name corresponding to the block height 122 is different from the owner information of the target domain name corresponding to the block height 110, the server may compare the owner information of the target domain name corresponding to the block height 122 and owner information of the target domain name corresponding to the block height 120.

Step z7: If the owner information of the target domain name corresponding to the block height 122 is the same as the owner information of the target domain name corresponding to the block height 120, the server may encapsulate the IP address of the target domain name and verification-related information corresponding to the block height 120 into a DNS response message to return to the client.

Optionally, the verification-related information corresponding to the block height 120 may include: owner information of the target domain name corresponding to the block height 120, a bloom filter corresponding to the target domain name corresponding to the block height 120, and second verification information for verifying the bloom filter corresponding to the target domain name corresponding to the block height 120. In the DNS response message, a value of the subfield 1 may be a binary value of 11, a value of the subfield 2 may be a binary value of 01111111, and <L, V> may be a decimal value of 120. The value of the subfield 2 equal to the binary value of 01111111 may indicate that the verification information buffered in the client is unavailable, and the server returns the first verification information and all information in the second verification information. The decimal value of <L, V> equal to 120 may indicate that a block height corresponding to the verification information returned by the server is 120.

Alternatively, the verification-related information corresponding to the block height 120 may include: owner information of the target domain name corresponding to the block height 110 and the block height 120, a bloom filter corresponding to the target domain name, and differential verification information of second verification information for verifying the bloom filter corresponding to the target domain name.

Step z8: If the owner information of the target domain name corresponding to the block height 122 is different from the owner information of the target domain name corresponding to the block height 120, the server may encapsulate an IP address of the target domain name and the verification-related information corresponding to the block height 122 into a DNS response message to return to the client.

Optionally, the verification-related information corresponding to the block height 122 may include: the owner information of the target domain name corresponding to the block height 122, a bloom filter corresponding to the target domain name corresponding to the block height 122, and second verification information for verifying the bloom filter corresponding to the target domain name corresponding to the block height 122. In the DNS response message, a value of the subfield 1 may be a binary value of 11, a value of the subfield 2 may be a binary value of 01111111, and <L, V> may be a decimal value of 122. The value of the subfield 2 equal to the binary value of 01111111 may indicate that the verification information buffered in the client is unavailable, and the server returns the first verification information and all information in the second verification information. The decimal value of <L, V> equal to 122 may indicate that a block height corresponding to the verification information returned by the server is 122.

Alternatively, the verification-related information corresponding to the block height 122 may include: owner information of the target domain name corresponding to the block height 110 and the block height 122, a bloom filter corresponding to the target domain name, and differential verification information of second verification information for verifying the bloom filter corresponding to the target domain name.

It should be noted that step z9 may be performed after step z7 or step z8.

Step z9: After receiving the DNS response message, the client performs verification based on the DNS response message.

Specifically, if the DNS response message includes the verification-related information corresponding to the block height 120, step z9 may specifically include: The client may verify, based on the second verification information corresponding to the block height 120, the first verification information corresponding to the block height 120; store the first verification information corresponding to the block height 120 when the verification succeeds; and verify the obtained owner information of the target domain name based on the first verification information corresponding to the block height 120 obtained after the verification succeeds.

If the DNS response message includes the verification-related information corresponding to the block height 122, step z9 may specifically include: The client may verify, based on the second verification information corresponding to the block height 122, the first verification information corresponding to the block height 122; store the first verification information corresponding to the block height 122 when the verification succeeds; and verify the obtained owner information of the target domain name based on the first verification information corresponding to the block height 122 obtained after the verification succeeds.

Figure 14:
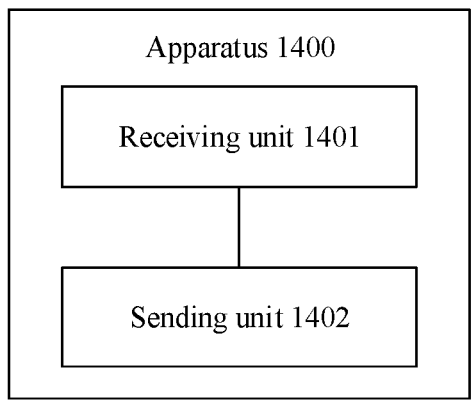
FIG. 14 is a schematic diagram depicting a structure of an information verification apparatus according to an embodiment of this application.

FIG. 14 is a schematic diagram depicting a structure of an information verification apparatus according to an embodiment of this application. The information verification apparatus 1400 provided in this embodiment may be used in a server. As shown in FIG. 14, the information verification apparatus in this embodiment may include a receiving unit 1401 and a sending unit 1402.

The receiving unit 1401 is configured to receive a first message sent by a client, where the first message includes a target domain name and first indication information, the first indication information is used to indicate a status of first verification information stored in a client, the first verification information is verification information generated based on a plurality of domain names and owner information of the plurality of domain names, the first verification information is used to verify the owner information of the plurality of domain names, and the plurality of domain names include the target domain name.

The sending unit 1402 is configured to send a second message to the client based on the first message, where the second message is used to indicate target first verification information, and the target first verification information is used by the client to verify owner information of the target domain name.

In a possible implementation, the first verification information is verified by the client based on second verification information.

In a possible implementation, the first indication information is specifically used to indicate that the first verification information is stored in the client, and that a version of the stored first verification information is a first version.

The sending unit 1402 is specifically configured to:

determine, based on the first message, whether first owner information of the target domain name is the same as second owner information of the target domain name, where the first owner information is owner information of the target domain name that is used to generate a second version of the first verification information, the second owner information is owner information of the target domain name that is used to generate the first version of the first verification information, and the second version is a latest version of the first verification information; and send the second message to the client if the first owner information of the target domain name is different from the second owner information of the target domain name, where the second message includes the second version of the first verification information and target second verification information, the target second verification information is the second verification information used by the client to verify the second version of the first verification information, and the second version of the first verification information is the target first verification information; or send the second message to the client if the first owner information of the target domain name is the same as the second owner information of the target domain name, where the target first verification information is the first verification information stored in the client.

In a possible implementation, the target first verification information is the first verification information stored in the client, and the second message is further used to indicate a version number of the second version.

The receiving unit 1401 is further configured to receive a third message that is sent by the client based on the version number of the second version, where the third message is used to indicate to request the latest version of the first verification information.

The sending unit 1402 is further configured to send a fourth message to the client based on the third message, where the fourth message includes the latest version of the first verification information.

In a possible implementation, the first indication information is specifically used to indicate that the first verification information is not stored in the client.

The second message includes the second version of the first verification information and the target second verification information, where the target second verification information is the second verification information used by the client to verify the second version of the first verification information. The second version is the latest version of the first verification information, and the second version of the first verification information is the target first verification information.

In a possible implementation, the first message further includes second indication information, where the second indication information is used to indicate the client to request partial information in the second verification information.

The target second verification information in the second message is specifically partial information in the target second verification information.

In a possible implementation, the second version is a latest generated version of the first verification information, or the second version is a version of the first verification information stored in a latest local snapshot.

In a possible implementation, the first verification information is verification information generated by a blockchain node based on the plurality of domain names and the owner information of the plurality of domain names, and the owner information of the target domain names is stored and maintained by a target smart contract account of a blockchain.

In a possible implementation, the first verification information is verification information generated by a blockchain node based on the plurality of domain names and the owner information of the plurality of domain names. The owner information of the target domain names is stored and maintained by a target smart contract account of a blockchain, and the second verification information is information in the blockchain.

The information verification apparatus provided in this embodiment can be configured to execute the technical solution on the server side in the embodiment shown in FIG. 5. Implementation principles and technical effects thereof are similar, and details are not described herein again.

Figure 15:
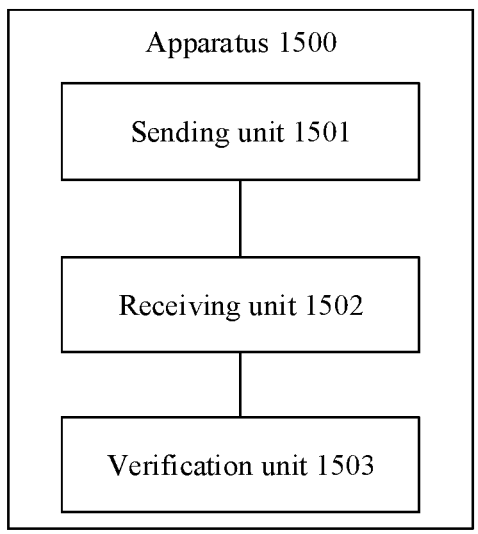
FIG. 15 is a schematic diagram depicting a structure of an information verification apparatus according to another embodiment of this application.

FIG. 15 is a schematic diagram depicting a structure of an information verification apparatus according to another embodiment of this application. The information verification apparatus provided in this embodiment may be used in a client. As shown in FIG. 15, the information verification apparatus 1500 in this embodiment may include a sending unit 1501, a receiving unit 1502, and a verification unit 1503.

The sending unit 1501 is configured to send a first message to a server, where the first message includes a target domain name and first indication information, the first indication information is used to indicate a status of first verification information stored in a client, the first verification information is verification information generated based on a plurality of domain names and owner information of the plurality of domain names, the first verification information is used to verify the owner information of the plurality of domain names, and the plurality of domain names include the target domain name.

The receiving unit 1502 is configured to receive a second message sent by the server based on the first message, where the second message is used to indicate target first verification information, and the target first verification information is used by the client to verify owner information of the target domain name.

The verification unit 1503 is configured to verify the obtained owner information of the target domain name based on the second message.

In a possible implementation, the first verification information is verified by the client based on second verification information.

In a possible implementation, the first indication information is specifically used to indicate that the first verification information is stored in the client, and that a version of the stored first verification information is a first version.

The second message includes a second version of the first verification information and target second verification information, where the target second verification information is the second verification information used by the client to verify the second version of the first verification information, and the second version of the first verification information is the target first verification information.

The verification unit 1503 is specifically configured to:
verify the second version of the first verification information based on the target second verification information; and
after verification of the second version of the first verification information succeeds, verify the owner information of the target domain name based on the second version of the first verification information.

In a possible implementation, the first indication information is specifically used to indicate that the first verification information is stored in the client, and that a version of the stored first verification information is a first version.

The first target verification information is the first verification information stored in the client.

The verification unit 1503 is specifically configured to:
verify the owner information of the target domain name based on the first version of the first verification information.

In a possible implementation, the second message is further used to indicate a version number of the second version.

The sending unit 1501 is further configured to send a third message to the server based on the version number of the second version, where the third message is used to indicate to request a latest version of the first verification information.

The receiving unit 1502 is further configured to receive a fourth message sent by the server based on the third message, where the fourth message includes the latest version of the first verification information, and store the latest version of the first verification information.

In a possible implementation, the first indication information is specifically used to indicate that the first verification information is not stored in the client.

The second message includes a second version of the first verification information and target second verification information, where the target second verification information is the second verification information used by the client to verify the second version of the first verification information. The second version is a latest version of the first verification information, and the second version of the first verification information is the target first verification information.

The verification unit 1503 is specifically configured to:
verify the second version of the first verification information based on the target second verification information; and
after verification of the second version of the first verification information succeeds, verify the owner information of the target domain name based on the second version of the first verification information.

In a possible implementation, the apparatus further includes a determining unit, configured to determine, based on stored verification information, to request partial information in the first verification information from the server.

The first message further includes second indication information, where the second indication information is used to indicate the client to request partial information in the second verification information.

The target second verification information in the second message is specifically the partial information in the target second verification information.

In a possible implementation, the second version is a latest generated version of the first verification information, or the second version is a version of the first verification information stored in a latest local snapshot.

In a possible implementation, the first verification information is verification information generated by a blockchain node based on the plurality of domain names and the owner information of the plurality of domain names, and the owner information of the target domain names is stored and maintained by a target smart contract account of a blockchain.

In a possible implementation, the first verification information is verification information generated by a blockchain node based on the plurality of domain names and the owner information of the plurality of domain names. The owner information of the target domain names is stored and maintained by a target smart contract account of a blockchain, and the second verification information is information in the blockchain.

The information verification apparatus provided in this embodiment can be configured to execute the technical solution on the client side in the embodiment shown in FIG.

5. Implementation principles and technical effects thereof are similar, and details are not described herein again.

It should be noted that division into the foregoing units of the communications apparatus is merely logical function division. In actual implementation, all or some of the units may be integrated into one physical entity, or may be physically separated. In addition, these units may all be implemented in the form of software invoked by processor elements. Alternatively, all of them may be implemented in a form of hardware. Alternatively, some units may be implemented in a form of software invoked by processor elements, and some units may be implemented in a form of hardware. For example, the sending unit may be a processing element disposed separately, or may be integrated into a chip of a communications apparatus. In addition, the sending unit may be stored in a memory of the communications apparatus in a form of a program, and invoked by a processing element of the communications apparatus to perform the function of the unit. Implementation of other units is similar. In addition, some or all of the units may be integrated together, or the units may be implemented independently. The processing element may be an integrated circuit and has a signal processing capability. In an implementation process, steps in the foregoing methods or the foregoing units can be implemented by using a hardware integrated logical circuit in the processing element, or by using instructions in a form of software. In addition, the foregoing sending unit is a unit for controlling sending, and may receive information by using a sending apparatus of the communications apparatus, for example, an antenna or a radio frequency apparatus.

The foregoing units may be configured as one or more integrated circuits for implementing the foregoing method, for example, one or more application-specific integrated circuits (ASIC); or may be configured as one or more microprocessors (DSP), one or more field programmable gate arrays (FPGA), or the like. For another example, when one of the foregoing units is implemented by a processing element invoking a program, the processing element may be a general-purpose processor, such as a central processing unit (CPU) or another processor that can invoke a program. For another example, the units may be integrated and implemented in a form of a system-on-a-chip (SOC).

Figure 16:
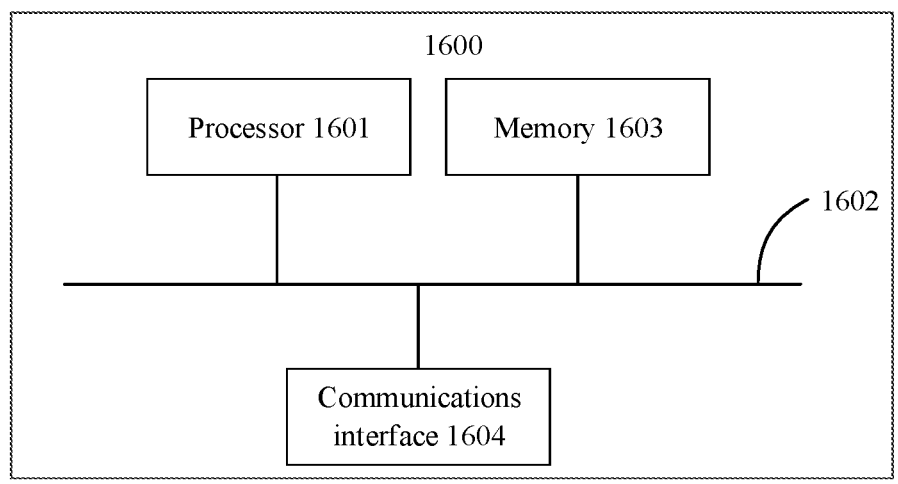
FIG. 16 is a schematic diagram depicting a structure of hardware of an information verification device according to an embodiment of this application.

FIG. 16 is a schematic diagram depicting a structure of hardware of an information verification device according to an embodiment of this application. The information verification device 1600 includes at least one processor 1601, a communications bus 1602, a memory 1603, and at least one communications interface 1604.

The processor 1601 may be a general-purpose central processing unit (CPU), a microprocessor, an application-specific integrated circuit (ASIC), or one or more integrated circuits configured to control program execution of the solutions in this application.

The communications bus 1602 may include a path, to transmit information between the foregoing components.

The communications interface 1604, which uses any apparatus such as a transceiver, is configured to communicate with another device or a communications network, such as the Ethernet, a radio access network (RAN), or a wireless local area network (WLAN).

The memory 1603 may be a read-only memory (ROM), another type of static storage device that can store static information and instructions, a random access memory (RAM), another type of dynamic storage device that can store information and instructions, an electrically erasable programmable read-only memory (EEPROM), a compact disc read-only memory (CD-ROM), another optical disc storage, an optical disc storage (including a compact disc, a laser disc, an optical disc, a digital versatile disc, a Blu-ray disc, and the like), a disk storage medium or another magnetic storage device, or any other medium that can be used to carry or store expected program code in a form of instructions or a data structure and that can be accessed by a computer, but is not limited thereto. The memory may exist independently, and is connected to a processor through a bus. The memory may alternatively be integrated with the processor.

The memory 1603 is configured to store application program code for executing the solutions in this application, and the processor 1601 controls the execution of the application program code. The processor 1601 is configured to execute the application program code stored in the memory 1603, to implement the information verification methods provided in the foregoing embodiments of this application.

Alternatively, optionally, in this embodiment of this application, the processor 1601 may perform related functions in the information verification methods provided in the foregoing embodiments of this application, and the communications interface 1604 is responsible for communication with another device or a communications network. This is not specifically limited in this embodiment of this application.

During specific implementation, in an embodiment, the processor 1601 may include one or more CPUs.

During specific implementation, in an embodiment, the information verification device 1600 may include a plurality of processors. Each of the processors may be a single-CPU processor, or may be a multi-CPU processor. The processor herein may be one or more devices, circuits, and/or processing cores configured to process data (for example, a computer program instruction).

During specific implementation, in an embodiment, the information verification device 1600 may further include an output device and an input device. The output device communicates with the processor 1601, and may display information in a plurality of manners. For example, the output device may be a liquid crystal display (LCD), a light emitting diode (LED) display device, a cathode ray tube (CRT) display device, a projector, or the like. The input device communicates with the processor 1601, and may receive user input in a plurality of manners. For example, the input device may be a mouse, a keyboard, a touchscreen device, or a sensing device.

In addition, as described above, the information verification device 1600 provided in this embodiment of this application may be a chip, a client, a server, or a device with a structure similar to that shown in FIG. 16. A type of the information verification device 1600 is not limited in this embodiment of this application.

In this embodiment, the information verification device 1600 is presented in a form in which division into functional modules may be performed in an integrated manner. The "module" herein may be an application-specific integrated circuit (ASIC), a circuit, a processor executing one or more software or firmware programs, a memory, an integrated logic circuit, and/or another component that can provide the foregoing functions. In a simple embodiment, a person skilled in the art may figure out that the information verification device 1600 may use the form shown in FIG. 16. For example, functions/implementation processes of the receiving units in FIG. 14 and FIG. 15 may be implemented by using the communications interface 1604 in FIG. 16. This is not limited in the embodiments of this application. For another example, the determining unit in FIG. 15 may be executed by the processor 1601 by invoking the application program code stored in the memory 1603. This is not limited in this embodiment of this application.

It should be noted that the information verification device provided in the embodiment shown in FIG. 16 may be specifically the server in the embodiment shown in FIG. 5. When invoking the program stored in the memory 1603, the processor 1601 may perform the method on the server side provided in the embodiment shown in FIG. 5.

It should be noted that the information verification device provided in the embodiment shown in FIG. 16 may be specifically the client in the embodiment shown in FIG. 5. When invoking the program stored in the memory 1603, the processor 1601 may perform the method on the client side provided in the embodiment shown in FIG. 5.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

What is claimed is:

1. An information verification method, comprising:
    sending a first message to a server, wherein the first message comprises a target domain name and first indication information, the first indication information indicates whether first verification information is stored in a client device, and the first verification information is verification information generated based on a plurality of domain names and owner information of the plurality of domain names, wherein the first verification information verifies the owner information of the plurality of domain names, and the plurality of domain names comprise the comprises the target domain name;
    receiving a second message sent by the server based on the first message, wherein the second message indicates target first verification information, and the target first verification information is used by the client device to verify owner information of the target domain name; and
    verifying the owner information of the target domain name based on the second message;
    wherein the first verification information is verified by the client device based on second verification information;
    wherein the first indication information indicates that the first verification information is stored in the client device, and that a version of the stored first verification information is a first version;
    wherein the second message comprises target second verification information and a second version of the first verification information, the target second verification information is the second verification information used by the client device to verify the second version of the first verification information, and the second version of the first verification information is the target first verification information; and
    wherein verifying the owner information of the target domain name based on the second message comprises:
        verifying the second version of the first verification information based on the target second verification information; and
        after verifying the second version of the first verification information succeeds. verifying the owner information of the target domain name based on the second version of the first verification information.

2. The method according to claim 1, wherein the second message further indicates a version number of the second version of the first verification information; and
    wherein the method further comprises:
        sending a third message to the server based on the version number of the second version, wherein the third message indicates to request a latest version of the first verification information;
        receiving a fourth message sent by the server based on the third message, wherein the fourth message comprises the latest version of the first verification information; and
        storing the latest version of the first verification information.

3. The method according to claim 1, wherein before sending the first message to the server, the method further comprises:
    determining, based on stored verification information, to request partial information in the first verification information from the server;
    wherein the first message further comprises second indication information, wherein the second indication information indicates the client device to request partial information in the second verification information; and
    the target second verification information in the second message is the partial information in the target second verification information.

4. The method according to claim 1, wherein the second version is a latest generated version of the first verification information, or the second version is a version of the first verification information stored in a latest local snapshot.

5. The method according to claim 1, wherein the first verification information is verification information generated by a blockchain node based on the plurality of domain names and the owner information of the plurality of domain names, wherein the owner information of the target domain name is stored and maintained by a target smart contract account of a blockchain.

6. The method according to claim 1, wherein the first verification information is the verification information generated by a blockchain node based on the plurality of domain names and the owner information of the plurality of domain names, wherein the owner information of the target domain name is stored and maintained by a target smart contract account of a blockchain, and the second verification information is information in the blockchain.

7. An information verification apparatus, comprising:
a non-transitory computer-readable storage medium storing instructions; and
one or more processors in communication with the non-transitory computer-readable storage medium, and wherein the one or more processors, upon execution of the instructions, are configured to:
send a first message to a server, wherein the first message comprises a target domain name and first indication information, the first indication information indicates whether first verification information is stored in a client device, and the first verification information is verification information generated based on a plurality of domain names and owner information of the plurality of domain names, wherein the first verification information verifies the owner information of the plurality of domain names, and the plurality of domain names comprises the target domain name;
receive a second message sent by the server based on the first message, wherein the second message indicates target first verification information, and the target first verification information is used by the client device to verify owner information of the target domain name; and
verify the owner information of the target domain name based on the second message;
wherein the first verification information is verified by the client device based on second verification information;
wherein the first indication information indicates that the first verification information is stored in the client device, and that a version of the stored first verification information is a first version;
wherein the second message comprises target second verification information and a second version of the first verification information, the target second verification information is the second verification information used by the client device to verify the second version of the first verification information, and the second version of the first verification information is the target first verification information; and
wherein the one or more processors, upon execution of the instructions, are configured to:
verify the second version of the first verification information based on the target second verification information; and
after verifying the second version of the first verification information succeeds, verify the owner information of the target domain name based on the second version of the first verification information.

8. The apparatus according to claim 7, wherein the second message further indicates a version number of a second version;
the one or more processors, upon execution of the instructions, are configured to:
send a third message to the server based on the version number of the second version, wherein the third message indicates to request a latest version of the first verification information; and
receive a fourth message sent by the server based on the third message, wherein the fourth message comprises the latest version of the first verification information; and
store the latest version of the first verification information.

9. The apparatus according to claim 7, wherein the one or more processors, upon execution of the instructions, are configured to determine, based on stored verification information, to request partial information in the first verification information from the server;
wherein the first message further comprises second indication information, wherein the second indication information indicates the client device to request partial information in the second verification information; and
the target second verification information in the second message is the partial information in the target second verification information.

10. The apparatus according to claim 7, wherein the second version is a latest generated version of the first verification information, or the second version is a version of the first verification information stored in a latest local snapshot.

11. The apparatus according to claim 7, wherein the first verification information is verification information generated by a blockchain node based on the plurality of domain names and the owner information of the plurality of domain names, wherein the owner information of the target domain name is stored and maintained by a target smart contract account of a blockchain.

12. The apparatus according to claim 7, wherein the first verification information is verification information generated by a blockchain node based on the plurality of domain names and the owner information of the plurality of domain names, wherein the owner information of the target domain name is stored and maintained by a target smart contract account of a blockchain, and the second verification information is information in the blockchain.

* * * * *

UNITED STATES PATENT AND TRADEMARK OFFICE
CERTIFICATE OF CORRECTION

PATENT NO. : 12,231,439 B2
APPLICATION NO. : 17/479931
DATED : February 18, 2025
INVENTOR(S) : Shoushou Ren et al.

Page 1 of 1

It is certified that error appears in the above-identified patent and that said Letters Patent is hereby corrected as shown below:

In the Claims

In Column 33, In Line 59, In Claim 1, after "names" delete "comprise the".

In Column 34, In Line 6, In Claim 1, delete "in formation" and insert -- information --.

In Column 34, In Line 21, In Claim 1, delete "succeeds." And insert -- succeeds, --.

Signed and Sealed this
Twenty-second Day of July, 2025

Coke Morgan Stewart
*Acting Director of the United States Patent and Trademark Office*